United States Patent
Watanabe et al.

(10) Patent No.: US 12,204,182 B2
(45) Date of Patent: Jan. 21, 2025

(54) DATA CREATION APPARATUS, LIGHT CONTROL APPARATUS, DATA CREATION METHOD, AND DATA CREATION PROGRAM

(71) Applicant: HAMAMATSU PHOTONICS K.K., Hamamatsu (JP)

(72) Inventors: Koyo Watanabe, Hamamatsu (JP); Takashi Inoue, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 18/229,909

(22) Filed: Aug. 3, 2023

(65) Prior Publication Data

US 2023/0384624 A1   Nov. 30, 2023

Related U.S. Application Data

(62) Division of application No. 16/732,590, filed on Jan. 2, 2020, now Pat. No. 11,762,225.

(30) Foreign Application Priority Data

Jan. 8, 2019   (JP) .................... 2019-001132

(51) Int. Cl.
G06F 17/14   (2006.01)
G02F 1/01   (2006.01)

(52) U.S. Cl.
CPC .......... *G02F 1/0121* (2013.01); *G06F 17/148* (2013.01); *G02F 2201/305* (2013.01)

(58) Field of Classification Search
CPC .............................. G02F 17/148; G02F 17/00
(Continued)

(56) References Cited

U.S. PATENT DOCUMENTS

2003/0011776 A1 * 1/2003 Ogawa .................. G01J 11/00
                                                     356/450
2004/0233944 A1 * 11/2004 Dantus ............... G01B 9/02014
                                                     372/25
(Continued)

FOREIGN PATENT DOCUMENTS

JP            2791771 B2 *  8/1998
JP         2006023662 A  *  1/2006
(Continued)

OTHER PUBLICATIONS

Hacker, M., et al., "Iterative Fourier transform algorithm for phase-only pulse shaping," Optics Express, Aug. 13, 2001 / vol. 9, No. 4, pp. 191-199.

(Continued)

*Primary Examiner* — Kaveh C Kianni
(74) *Attorney, Agent, or Firm* — Faegre Drinker Biddle & Reath LLP

(57) ABSTRACT

An iterative Fourier transform unit of a modulation pattern calculation apparatus performs a Fourier transform on a waveform function including an intensity spectrum function and a phase spectrum function, performs a replacement of a temporal intensity waveform function based on a desired waveform after the Fourier transform, and then performs an inverse Fourier transform. The iterative Fourier transform unit performs the replacement using a result of multiplying a function representing the desired waveform by a coefficient. The coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

18 Claims, 23 Drawing Sheets

(58) Field of Classification Search
USPC .......................................................... 359/238
See application file for complete search history.

(56) References Cited

U.S. PATENT DOCUMENTS

| | | | | |
|---|---|---|---|---|
| 2006/0056468 | A1* | 3/2006 | Dantus | ............... G01B 9/02014 |
| | | | | 372/28 |
| 2006/0187974 | A1* | 8/2006 | Dantus | .................. H01S 3/0057 |
| | | | | 372/9 |
| 2007/0027689 | A1 | 2/2007 | Ozcan et al. | |
| 2017/0259374 | A1* | 9/2017 | Takiguchi | .......... B23K 26/0652 |
| 2018/0294615 | A1* | 10/2018 | Watanabe | .............. G05B 15/02 |
| 2018/0348549 | A1* | 12/2018 | Watanabe | .................. G02F 1/13 |
| 2019/0204626 | A1* | 7/2019 | Watanabe | .................. G02F 1/01 |

FOREIGN PATENT DOCUMENTS

| | | | | |
|---|---|---|---|---|
| JP | 2009-508161 A | | 2/2009 | |
| JP | 2010-204308 A | | 9/2010 | |
| JP | 2016-218142 A | | 12/2016 | |
| WO | WO 2007/033362 A2 | | 3/2007 | |
| WO | WO-2016056281 A1 | * | 4/2016 | ............... G02B 5/28 |
| WO | WO-2016129155 A1 | * | 8/2016 | |
| WO | WO-2016185974 A1 | * | 11/2016 | ............... G02F 1/01 |
| WO | WO-2016185979 A1 | * | 11/2016 | ............... G02F 1/01 |

OTHER PUBLICATIONS

Ripoll, Olivier, et al., "Review of iterative Fourier-transform algorithms for beam shaping applications," Optical Engineering, vol. 43, No. 11, Nov. 2004, pp. 2549-2556.

Andy Rundquist et al., "Pulse shaping with the Gerchberg-Saxton algorithm, Journal of Optical Society of America B", US, Optical Society of America, Oct. 2002, vol. 19, No. 10, pp. 2468-p. 2478-p.

* cited by examiner

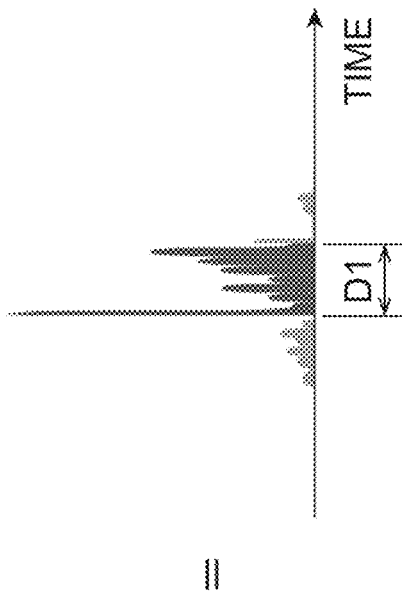
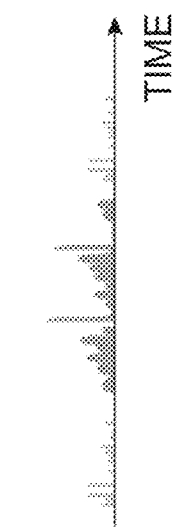
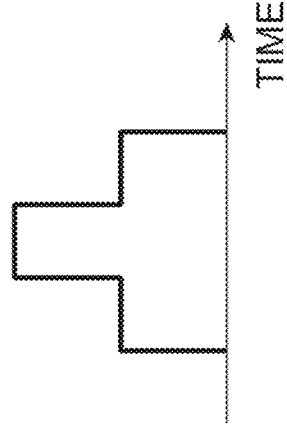

$\alpha \times \text{Target}_0(t)$ $\beta(\alpha \times \text{Target}_0(t) - b_n(t))$

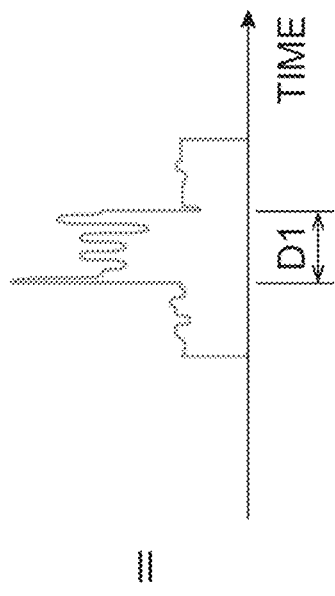
Fig.23A  $\alpha \times Target_0(t)$
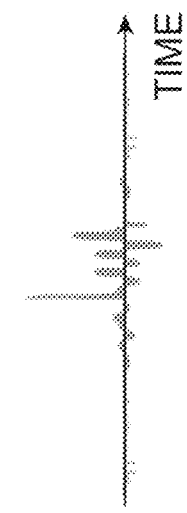
Fig.23B  $W_r(t) \times (\alpha \times Target_0(t) - b_n(t))$
$W_r(t) = Target_0(t)$
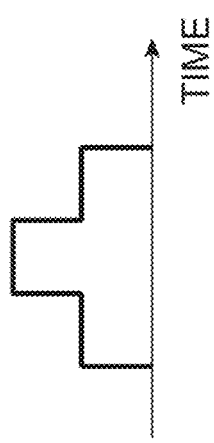
Fig.23C

DATA CREATION APPARATUS, LIGHT CONTROL APPARATUS, DATA CREATION METHOD, AND DATA CREATION PROGRAM

CROSS-REFERENCE TO RELATED APPLICATIONS

This application is a divisional application of U.S. application Ser. No. 16/732,590, filed Jan. 2, 2020, which claims the benefit of priority to Japanese Patent Application No. 2019-001132, filed Jan. 8, 2019, the entire contents of which are incorporated herein by reference.

TECHNICAL FIELD

The present disclosure relates to a data creation apparatus, a light control apparatus, a data creation method, and a data creation program.

BACKGROUND

Non Patent Document 1 discloses a technique for modulating a phase spectrum using a spatial light modulator (SLM) to shape a light pulse. In this document, a phase spectrum to obtain a desired light pulse waveform is calculated using an iterative Fourier method (iterative Fourier transform algorithm: IFTA). Further, Non Patent Document 2 discloses an iterative Fourier method modified to avoid a solution from being led to a local solution, in phase spectrum modulation to shape a light pulse.

Further, Patent Document 1 discloses a technique for shaping a light pulse by modulating a phase spectrum and an intensity spectrum using the SLM. In a method described in Patent Document 1, a phase spectrum and an intensity spectrum to obtain a desired light pulse waveform are calculated using an improved iterative Fourier method.

Patent Document 1: Japanese Patent Application Laid-Open Publication No. 2016-218142

Non Patent Document 1: M. Hacker, G. Stobrawa, T. Feurer, "Iterative Fourier transform algorithm for phase-only pulse shaping", Optics Express, Vol. 9, No. 4, pp. 191-199, 2001

Non Patent Document 2: Olivier Ripoll, Ville Kettunen, Hans Peter Herzig, "Review of iterative Fourier-transform algorithms for beam shaping applications", Optical Engineering, Vol. 43, No. 11, pp. 2549-2556, 2004

SUMMARY

For example, as a technique for controlling a temporal waveform of a variety of light such as ultrashort pulse light, a technique for modulating a phase spectrum and an intensity spectrum of a light pulse by the SLM is known. In this technique, a modulation pattern to give, to the light, a phase spectrum and an intensity spectrum (or one of them) to bring the temporal waveform of the light closer to a desired waveform is presented on the SLM. In this case, to easily realize an arbitrary temporal waveform, it is desirable to obtain these spectra by calculation.

When these spectra are obtained by the calculation, for example, as described in Non Patent Document 1, the iterative Fourier method is used. However, in the iterative Fourier method, there is a problem that a solution may be led to a local solution, and the solution is not necessarily an optimal solution. In view of the above problem, in Non Patent Document 2, a difference between a desired waveform and a waveform after a Fourier transform is multiplied by a predetermined coefficient, a result thereof is added to the desired waveform, and an iterative Fourier operation is performed.

However, even in the above method, for example, when the desired waveform and the waveform after the Fourier transform are greatly different from each other, the solution may be led to the local solution. Therefore, in the method described in Patent Document 1, at the time of the iterative Fourier operation, a replacement of the temporal intensity waveform is performed by using a result of multiplying a temporal function representing a desired temporal intensity waveform by a coefficient, and further, the coefficient is optimized using an evaluation function, so that the solution is prevented from being led to the local solution.

However, in the example of the evaluation function described in Patent Document 1, the evaluation is performed uniformly within a certain time region. That is, a part where the light intensity is relatively low in the temporal waveform of the light pulse, or a part where only noise exists is evaluated with the same importance as that of a part where the light intensity is high. For this reason, the above method is effective when waveform control in the part where the light intensity is relatively low is important, on the other hand, for example, when a utility value of the temporal waveform in the part with the high light intensity is high and the temporal waveform in the part with the low light intensity can be ignored, as in laser processing or a nonlinear optical microscope, the above method is not necessarily an optimal design method.

An object of an embodiment is to provide a data creation apparatus, a light control apparatus, a data creation method, and a data creation program, which are capable of calculating an intensity spectrum or a phase spectrum to bring a temporal waveform in a part with a high light intensity particularly in a temporal waveform of light closer to a desired waveform with higher accuracy while preventing a solution from being led to a local solution at the time of an iterative Fourier operation.

An embodiment is a data creation apparatus. The data creation apparatus is an apparatus for creating data for controlling a spatial light modulator, and includes a phase spectrum design unit for generating a phase spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the intensity spectrum function in the frequency domain after the inverse Fourier transform; and a data generation unit for creating the data on the basis of the intensity spectrum function and the phase spectrum function generated by the phase spectrum design unit, and the phase spectrum design unit performs the first replacement using a result of multiplying a function representing the desired temporal intensity waveform by a coefficient, and the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

An embodiment is a data creation method. The data creation method is a method for creating data for controlling a spatial light modulator, and includes a phase spectrum calculation step of generating a phase spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the intensity spectrum function in the frequency domain after the inverse Fourier transform; and a data generation step of creating the data on the basis of the intensity spectrum function and the phase spectrum function generated in the phase spectrum calculation step, and in the phase spectrum calculation step, the first replacement is performed using a result of multiplying a function representing the desired temporal intensity waveform by a coefficient, and the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

An embodiment is a data creation program. The data creation program is a program for creating data for controlling a spatial light modulator, and causes a computer to execute a phase spectrum calculation step of generating a phase spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the intensity spectrum function in the frequency domain after the inverse Fourier transform; and a data generation step of creating the data on the basis of the intensity spectrum function and the phase spectrum function generated in the phase spectrum calculation step, and in the phase spectrum calculation step, the first replacement is performed using a result of multiplying a function representing the desired temporal intensity waveform by a coefficient, and the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

In the above apparatus, method, and program, the phase spectrum to bring the temporal intensity waveform of the light closer to the desired waveform is calculated in the phase spectrum design unit or the phase spectrum calculation step. At this time, as described above, in a normal iterative Fourier method, a solution may be led to a local solution, and the solution is not necessarily an optimal solution.

Therefore, in the above apparatus, method, and program, when a replacement based on the desired temporal intensity waveform is performed on the temporal intensity waveform function in the time domain obtained by the Fourier transform, a result of multiplying the function representing the desired temporal intensity waveform by the coefficient is used. The coefficient has a value with which a difference between the function after the multiplication of the coefficient and the temporal intensity waveform function after the Fourier transform decreases, as compared with that before the multiplication.

As a result, since the function before the replacement (that is, the temporal intensity waveform function after the Fourier transform) and the function after the replacement based on the desired temporal intensity waveform are close to each other, a solution is prevented from being led to a local solution. Therefore, according to the above apparatus, method, and program, it is possible to accurately calculate the phase spectrum for bringing the temporal waveform of the light closer to the desired waveform.

Further, in the above apparatus, method, and program, the coefficient by which the function representing the desired temporal intensity waveform is multiplied has a value with which a ratio of the above difference (that is, a ratio of the difference based on the intensity value of the desired temporal intensity waveform) is smaller when the intensity is higher at each time of the function before the multiplication. That is, by the multiplication of the coefficient, in a part with the high intensity in the function representing the desired temporal intensity waveform, the difference between the function before the replacement and the function after the replacement based on the desired temporal intensity waveform becomes smaller, and the phase spectrum can be calculated with higher accuracy. Therefore, the temporal waveform in the part where the light intensity is high particularly in the temporal waveform of the output light can be brought closer to the desired waveform with higher accuracy.

In addition, in the above apparatus, method, and program, "the ratio of the difference is smaller when the intensity is higher at each time" means that, for example, when the desired temporal intensity waveform includes a first part having a certain constant intensity and a second part having a higher constant intensity than the first part, an average of a ratio of a difference in the second part is smaller than an average of a ratio of a difference in the first part. The present disclosure is not limited to the case where at least a maximum intensity in the second part is lower than a minimum intensity in the first part.

An embodiment is a data creation apparatus. The data creation apparatus is an apparatus for creating data for controlling a spatial light modulator, and includes an intensity spectrum design unit for generating an intensity spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform; and a data generation unit for creating the data on the basis of the phase spectrum function and the intensity spectrum function generated by the intensity spectrum design unit, and the intensity spectrum design unit performs the first replacement using a result of multiplying a function representing the desired temporal intensity waveform by a coefficient, and the coefficient has a value with which a difference between the multiplication of the coefficient and the temporal intensity waveform function after the Fourier transform is smaller than a difference before the multiplication, and a ratio of the difference is smaller when an intensity is higher at each time of the function before the multiplication.

An embodiment is a data creation method. The data creation method is a method for creating data for controlling a spatial light modulator, and includes an intensity spectrum calculation step of generating an intensity spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform; and a data generation step of creating the data on the basis of the phase spectrum function and the intensity spectrum function generated in the intensity spectrum calculation step, and in the intensity spectrum calculation step, the first replacement is performed using a result of multiplying a function representing the desired temporal intensity waveform by a coefficient, and the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

An embodiment is a data creation program. The data creation program is a program for creating data for controlling a spatial light modulator, and causes a computer to execute an intensity spectrum calculation step of generating an intensity spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform; and a data generation step of creating the data on the basis of the phase spectrum function and the intensity spectrum function generated in the intensity spectrum calculation step, and in the intensity spectrum calculation step, the first replacement is performed using a result of multiplying a function representing the desired temporal intensity waveform by a coefficient, and the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

In the above apparatus, method, and program, the intensity spectrum to bring the temporal intensity waveform of the light closer to the desired waveform is calculated in the intensity spectrum design unit or the intensity spectrum calculation step. Further, similar to the apparatus, method, and program described above, when a replacement based on the desired temporal intensity waveform is performed on the temporal intensity waveform function in the time domain obtained by the Fourier transform, a result of multiplying the function representing the desired temporal intensity waveform by the coefficient is used. The coefficient has a value with which a difference between the function after the multiplication of the coefficient and the temporal intensity waveform function after the Fourier transform decreases, as compared with that before the multiplication. As a result, it is possible to accurately calculate the intensity spectrum for bringing the temporal waveform of the light closer to the desired waveform.

Further, in the above apparatus, method, and program, similar to the apparatus, method, and program described above, the coefficient by which the function representing the desired temporal intensity waveform is multiplied has a value with which a ratio of the above difference is smaller when the intensity is higher at each time of the function before the multiplication. As a result, the temporal waveform in the part where the light intensity is high particularly in the temporal waveform of the output light can be brought closer to the desired waveform with higher accuracy.

In addition, the definition of "the ratio of the difference is smaller when the intensity is higher at each time" in the apparatus, the method, and the program is the same as that in the apparatus, the method, and the program described above.

An embodiment is a light control apparatus. The light control apparatus includes a light source for outputting input light; a dispersive element for spectrally dispersing the input light; a spatial light modulator for modulating the input light after the dispersion and outputting modulated light; and an optical system for focusing the modulated light, and the spatial light modulator modulates the input light on the basis of the data created by the data creation apparatus of the above configuration.

According to the above light control apparatus, the input light is modulated on the basis of the data created by the data creation apparatus of the above configuration, so that it is possible to calculate an intensity spectrum or a phase spectrum to bring a temporal waveform in a part with a high light intensity particularly in a temporal waveform of light closer to a desired waveform with higher accuracy while preventing a solution from being led to a local solution at the time of an iterative Fourier operation.

According to a data creation apparatus, a light control apparatus, a data creation method, and a data creation program according to an embodiment, it is possible to calculate an intensity spectrum or a phase spectrum to bring a temporal waveform in a part with a high light intensity particularly in a temporal waveform of light closer to a desired waveform with higher accuracy while preventing a solution from being led to a local solution at the time of an iterative Fourier operation.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 12A to FIG. 12C are diagrams for visually explaining a process of a process number (4) in FIG. 11.

FIG. 23A to FIG. 23C are diagrams for visually explaining a process of a process number (5) in a modification.

DETAILED DESCRIPTION

Hereinafter, embodiments of a data creation apparatus, a light control apparatus, a data creation method, and a data creation program will be described in detail with reference to the accompanying drawings. In the description of the drawings, the same elements will be denoted by the same reference symbols, without redundant description.

Figure 1:
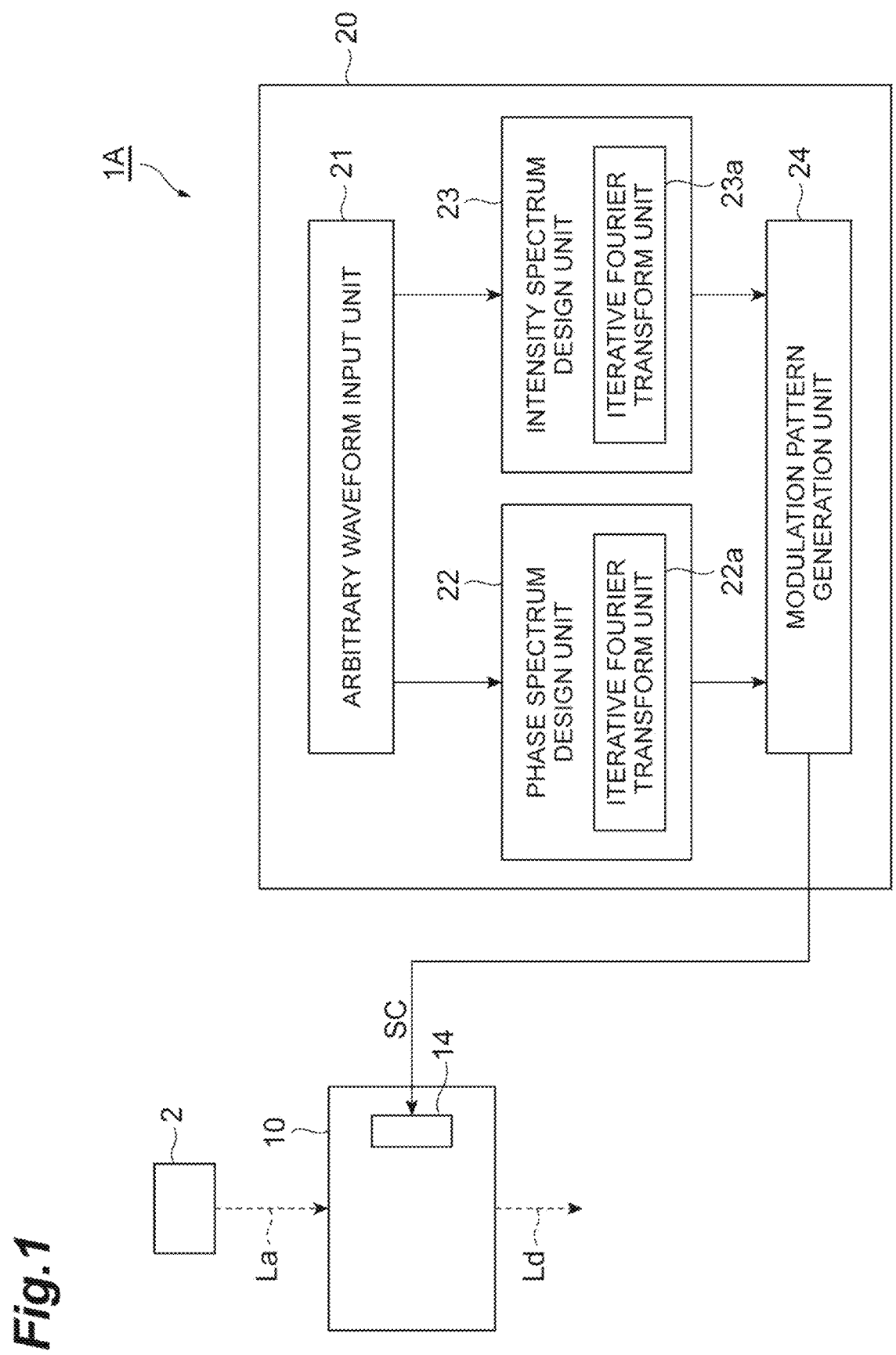
FIG. 1 is a diagram schematically illustrating a configuration of a light control apparatus according to an embodiment.
Figure 2:
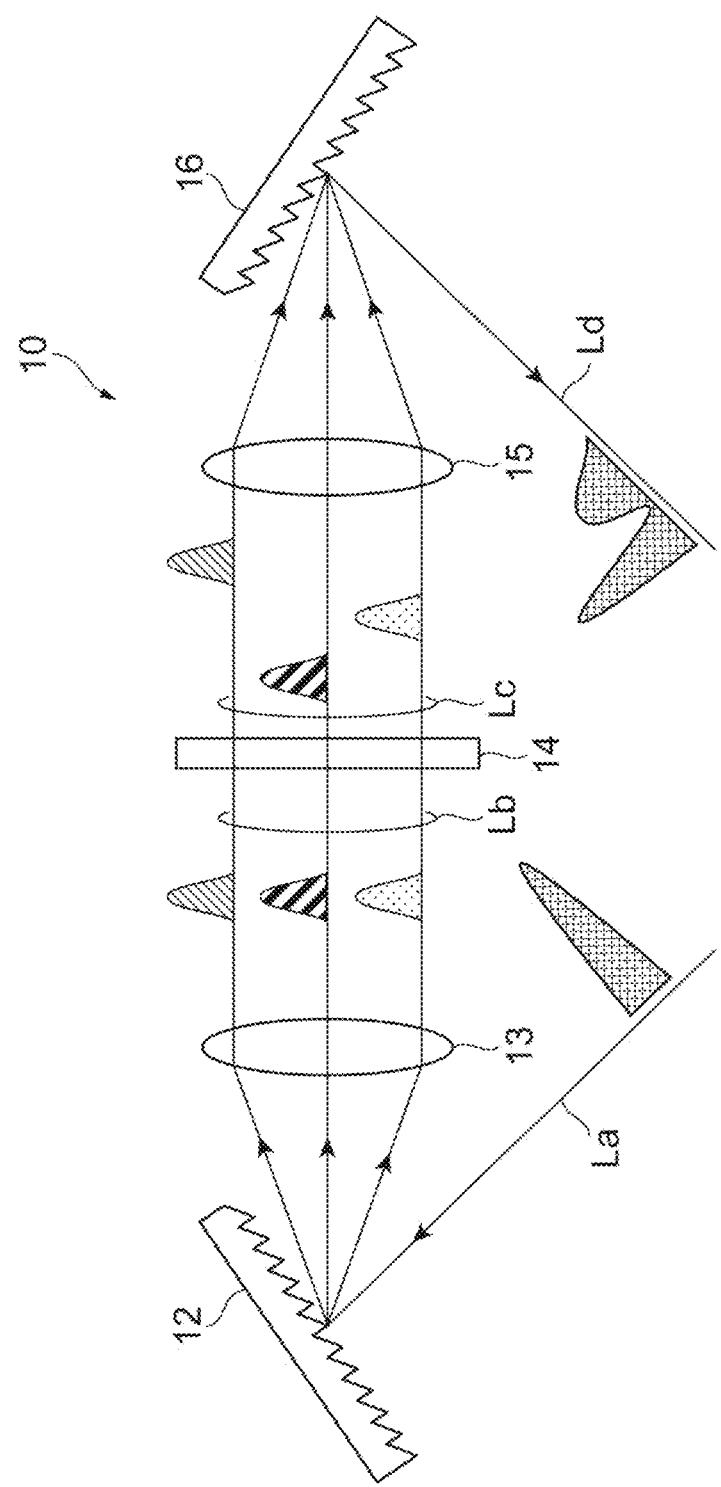
FIG. 2 is a diagram illustrating a configuration of an optical system included in the light control apparatus.

FIG. 1 is a diagram schematically illustrating a configuration of a light control apparatus 1A according to an embodiment. FIG. 2 is a diagram illustrating a configuration of an optical system 10 included in the light control apparatus 1A. The light control apparatus 1A according to the present embodiment generates, from input light La, output light Ld having an arbitrary temporal intensity waveform different from that of the input light La. As illustrated in FIG. 1, the light control apparatus 1A includes a light source 2, an optical system 10, and a modulation pattern calculation apparatus (data creation apparatus) 20.

The light source 2 outputs the input light La input to the optical system 10. The light source 2 is a laser light source such as a solid-state laser light source and a fiber laser light source, for example, and the input light La is coherent pulse light, for example. The optical system 10 has an SLM 14, and receives a control signal SC for controlling each pixel of the SLM 14 from the modulation pattern calculation apparatus 20 by the SLM 14. The optical system 10 converts the input light La from the light source 2 into the output light Ld having the arbitrary temporal intensity waveform. A modulation pattern is data for controlling the SLM 14, and is data in which intensities of a complex amplitude distribution or intensities of a phase distribution are output in a file. The modulation pattern is, for example, a computer-generated hologram (CGH).

As illustrated in FIG. 2, the optical system 10 includes a diffraction grating 12, a lens 13, an SLM 14, a lens 15, and a diffraction grating 16. The diffraction grating 12 is a dispersive element in the present embodiment, and is optically coupled to the light source 2. The SLM 14 is optically coupled to the diffraction grating 12 via the lens 13. The diffraction grating 12 spectrally disperses the input light La for each wavelength component. In addition, as the dispersive element, other optical components such as a prism may be used instead of the diffraction grating 12. Further, the dispersive element may be of a reflection type or a transmission type.

The input light La is obliquely incident on the diffraction grating 12, and is spectrally dispersed into a plurality of wavelength components. Light Lb including the plurality of wavelength components is focused for each wavelength component by the lens 13, and forms an image on a modulation plane of the SLM 14. The lens 13 may be a convex lens made of a light transmitting member or a concave mirror having a concave light reflection surface.

The SLM 14 simultaneously performs phase modulation and intensity modulation of the light Lb to generate the output light Ld having an arbitrary temporal intensity waveform different from that of the input light La. The SLM 14 may perform only the intensity modulation. The SLM 14 is of a phase modulation type, for example. In one example, the SLM 14 is of a liquid crystal on silicon (LCOS) type. Further, the SLM 14 may be an intensity modulation type SLM such as a digital micromirror device (DMD). Further, the SLM 14 may be of a reflection type or a transmission type.

Figure 3:
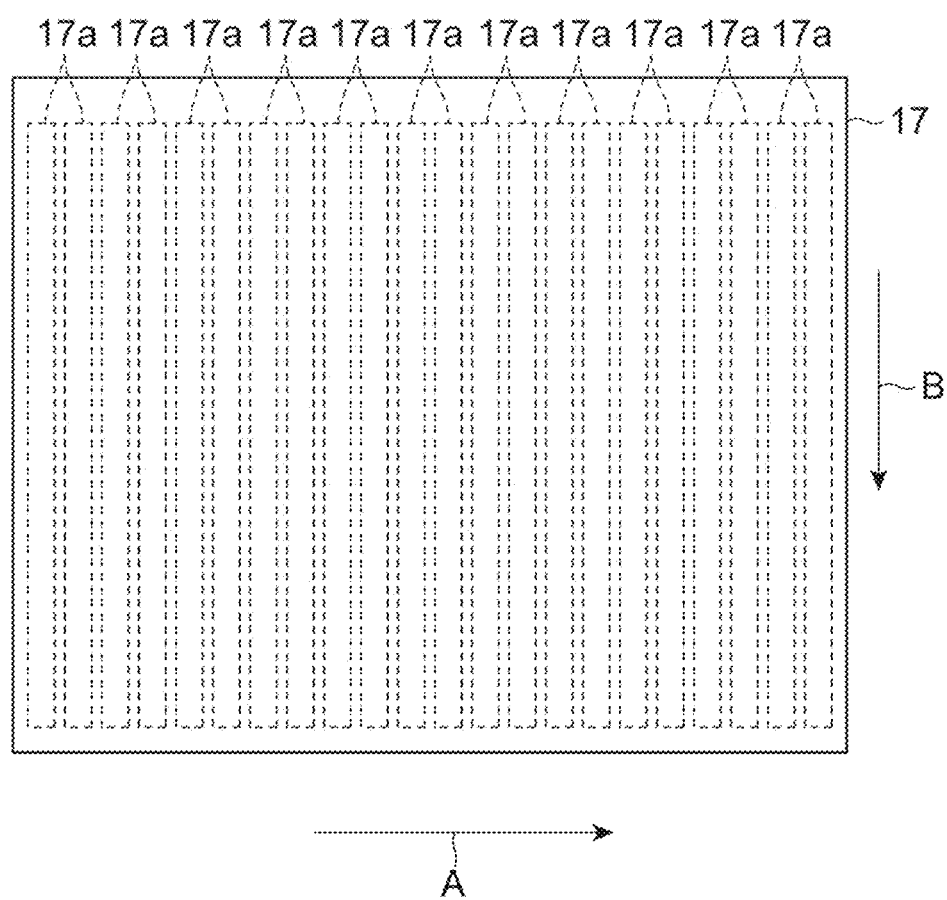
FIG. 3 is a diagram illustrating a modulation plane of an SLM.

FIG. 3 is a diagram illustrating a modulation plane 17 of the SLM 14. As illustrated in FIG. 3, in the modulation plane 17, a plurality of modulation regions 17a are arranged along a certain direction A, and each modulation region 17a extends in a direction B intersecting with the direction A. The direction A is a dispersing direction by the diffraction grating 12. The modulation plane 17 functions as a Fourier transform plane, and each corresponding wavelength component after the dispersion is incident on each of the plurality of modulation regions 17a. The SLM 14 modulates a phase and an intensity of each incident wavelength component, independently from the other wavelength components, in each modulation region 17a. In addition, because the SLM 14 in the present embodiment is of the phase modulation type, the intensity modulation is realized by a phase pattern (phase image) presented on the modulation plane 17.

Each wavelength component of modulated light Lc modulated by the SLM 14 is focused at a point on the diffraction grating 16 by the lens 15. At this time, the lens 15 functions as a focusing optical system for focusing the modulated light Lc. The lens 15 may be a convex lens made of a light transmitting member or a concave mirror having a concave light reflection surface. Further, the diffraction grating 16 functions as a combining optical system and combines the respective wavelength components after the modulation. That is, by the lens 15 and the diffraction grating 16, the plurality of wavelength components of the modulated light Lc are focused and combined with each other and become the output light Ld.

A region (spectrum domain) before the lens 15 and a region (time domain) behind the diffraction grating 16 are in a Fourier transform relation with each other, and the phase modulation and the intensity modulation in the spectrum domain affect the temporal intensity waveform in the time domain Therefore, the output light Ld has a desired temporal intensity waveform different from that of the input light La in accordance with the modulation pattern of the SLM 14.

Figure 4A:
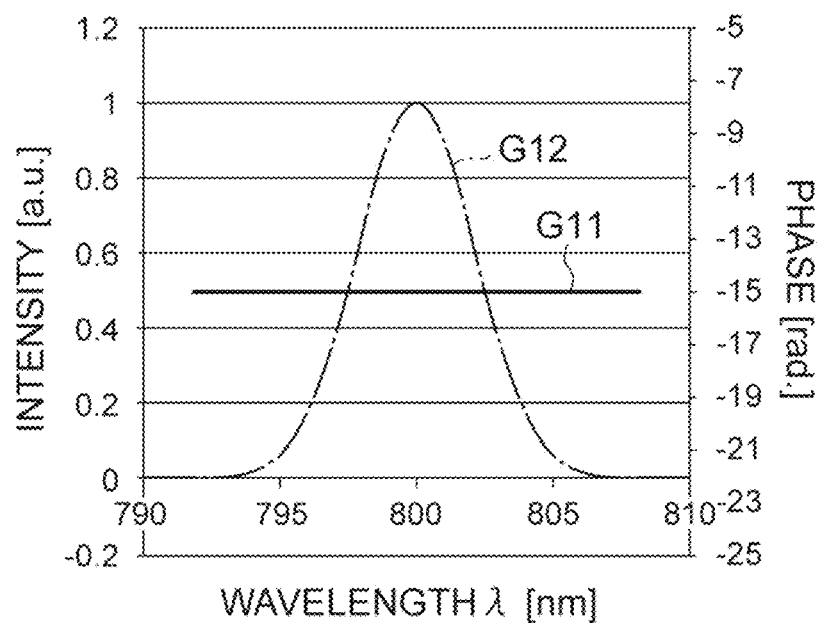
FIG. 4A and FIG. 4B are (A) a diagram illustrating, as an example, a spectrum waveform (a spectrum phase and a spectrum intensity) of single pulse shaped input light, and (B) a diagram illustrating a temporal intensity waveform of the input light.
Figure 4B:
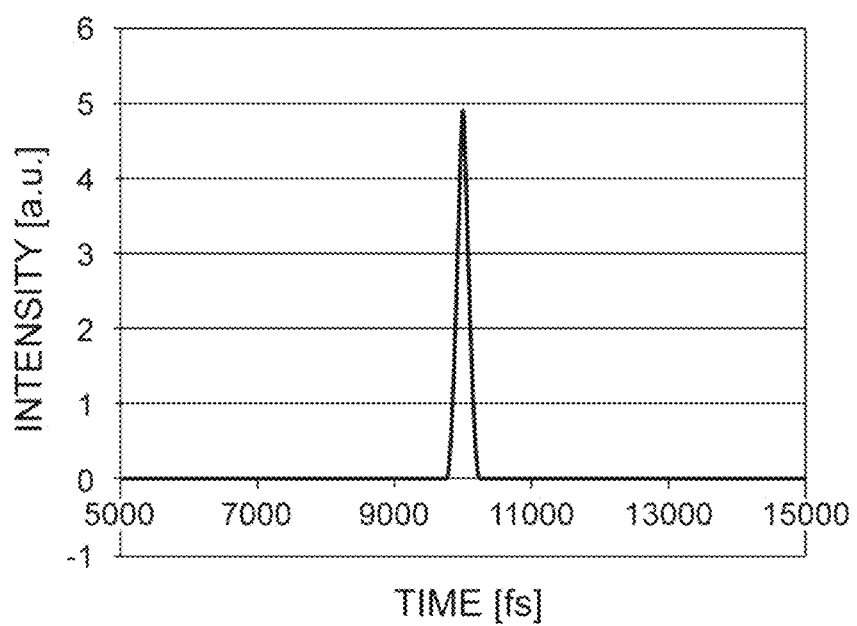
Figure 5A:
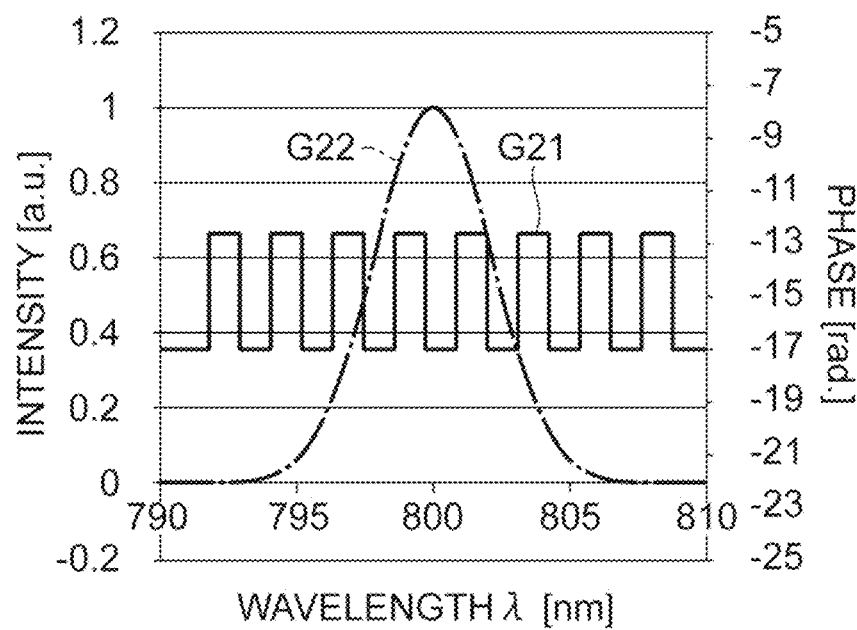
FIG. 5A and FIG. 5B are (A) a diagram illustrating, as an example, a spectrum waveform (a spectrum phase and a spectrum intensity) of output light when rectangular wave shaped phase spectrum modulation is applied in the SLM, and (B) a diagram illustrating a temporal intensity waveform of the output light.
Figure 5B:
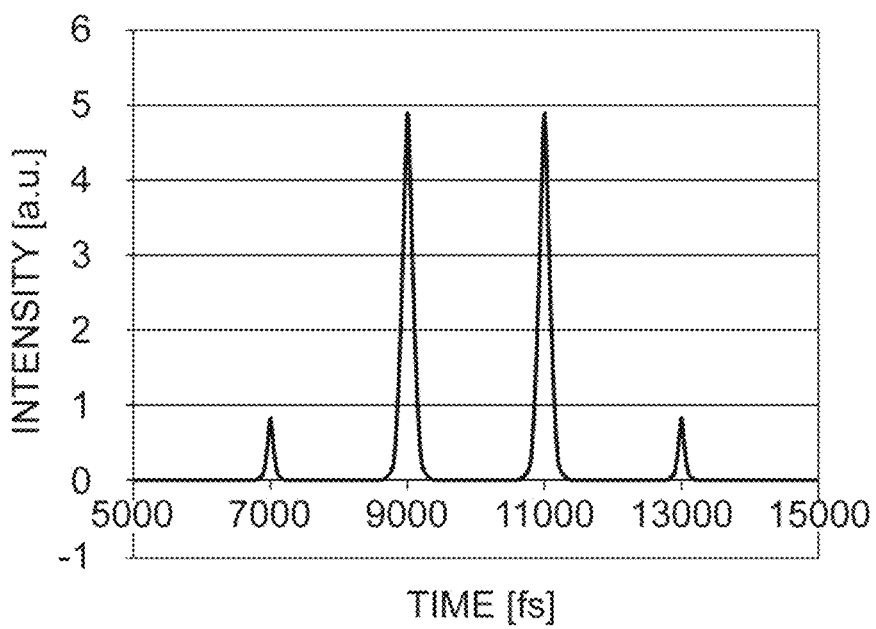

Here, as an example, FIG. 4A illustrates a spectrum waveform (a spectrum phase G11 and a spectrum intensity G12) of the single pulse shaped input light La, and FIG. 4B illustrates the temporal intensity waveform of the input light La. Further, as an example, FIG. 5A illustrates a spectrum waveform (a spectrum phase G21 and a spectrum intensity G22) of the output light Ld when rectangular wave shaped phase spectrum modulation is applied in the SLM 14, and FIG. 5B illustrates a temporal intensity waveform of the output light Ld. In FIG. 4A and FIG. 5A, a horizontal axis shows a wavelength (nm), a left vertical axis shows an intensity value (arbitrary unit) of the intensity spectrum, and a right vertical axis shows a phase value (rad) of the phase spectrum. Further, in FIG. 4B and FIG. 5B, a horizontal axis shows a time (femtosecond) and a vertical axis shows a light intensity (arbitrary unit).

In this example, a single pulse of the input light La is converted into a double pulse with high-order light as the output light Ld by giving a rectangular wave shaped phase spectrum waveform to the output light Ld. In addition, the spectra and the waveforms illustrated in FIG. 4A, FIG. 4B, FIG. 5A, and FIG. 5B are examples, and the temporal intensity waveform of the output light Ld can be controlled in various shapes by combinations of various phase spectra and intensity spectra.

FIG. 1 is referred to again. The modulation pattern calculation apparatus 20 is a computer having a processor including, for example, a personal computer, a smart device such as a smart phone and a tablet terminal, and a cloud server. The modulation pattern calculation apparatus 20 is electrically coupled to the SLM 14, calculates a phase modulation pattern to bring the temporal intensity waveform of the output light Ld closer to a desired waveform, and provides a control signal SC including the phase modulation pattern to the SLM 14.

The modulation pattern calculation apparatus 20 of the present embodiment presents, on the SLM 14, a phase pattern including a phase pattern for phase modulation that gives a phase spectrum for obtaining the desired waveform to the output light Ld and a phase pattern for intensity modulation that gives an intensity spectrum for obtaining the desired waveform to the output light Ld. For this purpose, the modulation pattern calculation apparatus 20 includes an arbitrary waveform input unit 21, a phase spectrum design unit 22, an intensity spectrum design unit 23, and a modulation pattern generation unit (data generation unit) 24.

That is, the processor of the computer provided in the modulation pattern calculation apparatus 20 realizes a function of the arbitrary waveform input unit 21, a function of the phase spectrum design unit 22, a function of the intensity spectrum design unit 23, and a function of the modulation pattern generation unit 24. The respective functions may be realized by the same processor or may be realized by different processors.

Figure 6:
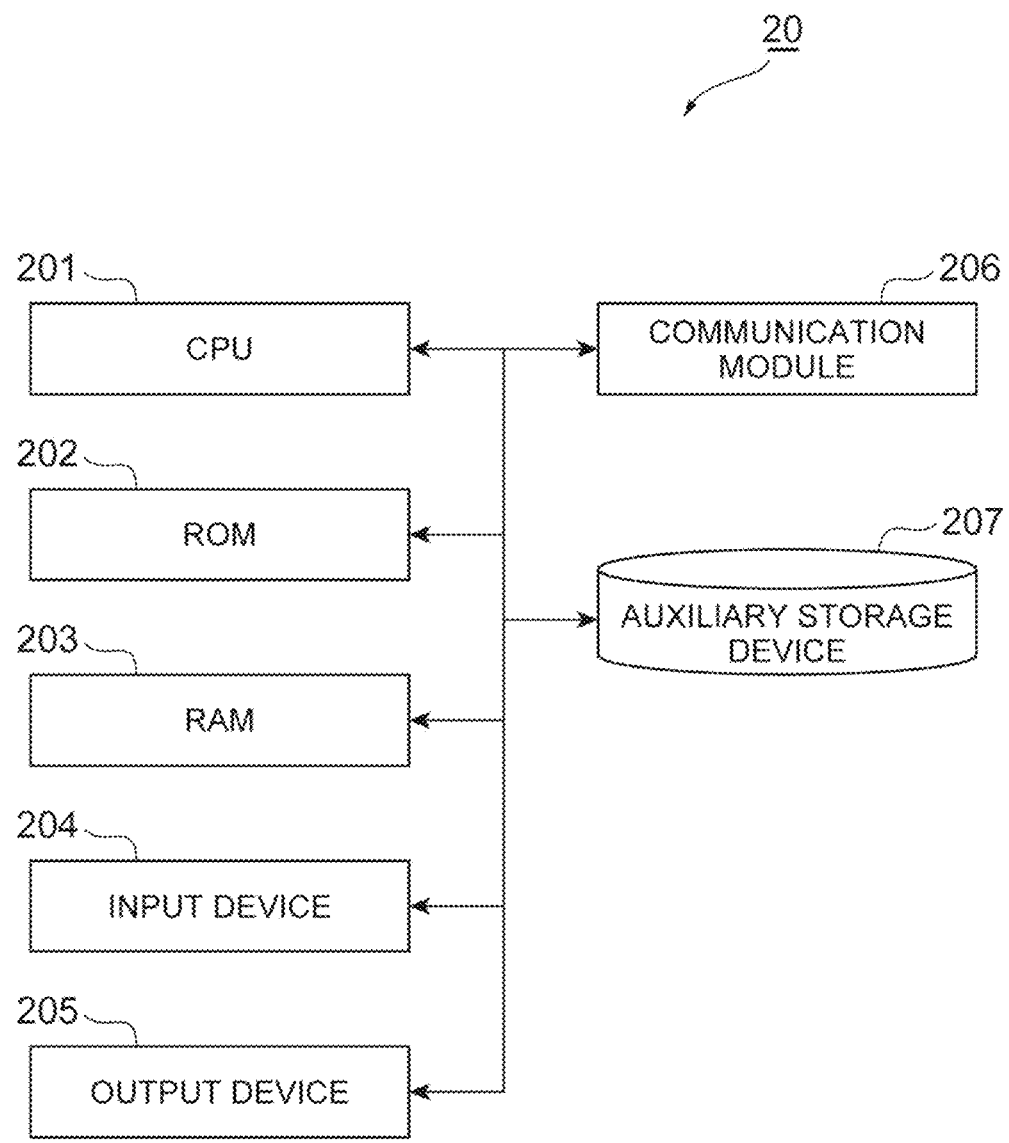
FIG. 6 is a diagram schematically illustrating a hardware configuration example of a modulation pattern calculation apparatus.

FIG. 6 is a diagram schematically illustrating a hardware configuration example of the modulation pattern calculation apparatus 20. As illustrated in FIG. 6, the modulation pattern calculation apparatus 20 can be physically configured as a normal computer including a processor (CPU) 201, a main storage device such as a ROM 202 and a RAM 203, an input device 204 such as a keyboard, a mouse, and a touch screen, an output device 205 such as a display (including a touch screen), a communication module 206 such as a network card for transmitting/receiving data to/from other devices, an auxiliary storage device 207 such as a hard disk, and the like.

The processor 201 of the computer can realize the above respective functions (the arbitrary waveform input unit 21, the phase spectrum design unit 22, the intensity spectrum design unit 23, and the modulation pattern generation unit 24) by a modulation pattern calculation program (data creation program). Therefore, the modulation pattern calculation program operates the processor 201 of the computer as the arbitrary waveform input unit 21, the phase spectrum design unit 22, the intensity spectrum design unit 23, and the modulation pattern generation unit 24 in the modulation pattern calculation apparatus 20.

The modulation pattern calculation program is stored in a storage device (storage medium) inside or outside the computer such as the auxiliary storage device 207, for example. The storage device may be a non-transitory recording medium. Examples of the recording medium include a recording medium such as a flexible disk, a CD, and a DVD, a recording medium such as a ROM, a semiconductor memory, a cloud server, and the like.

The arbitrary waveform input unit 21 receives the desired temporal intensity waveform input from an operator. The operator inputs information (for example, a pulse width, a pulse number, or the like) on the desired temporal intensity waveform to the arbitrary waveform input unit 21. The information on the desired temporal intensity waveform is given to the phase spectrum design unit 22 and the intensity spectrum design unit 23. The phase spectrum design unit 22 calculates the phase spectrum of the output light Ld suitable for realizing the given desired temporal intensity waveform. The intensity spectrum design unit 23 calculates the intensity spectrum of the output light Ld suitable for realizing the given desired temporal intensity waveform.

The modulation pattern generation unit 24 calculates a phase modulation pattern (for example, a computer-generated hologram) to give the phase spectrum obtained in the phase spectrum design unit 22 and the intensity spectrum obtained in the intensity spectrum design unit 23 to the output light Ld. In addition, the control signal SC including the calculated phase modulation pattern is provided to the SLM 14, and the SLM 14 is controlled on the basis of the control signal SC.

Here, a method of calculating a phase spectrum and an intensity spectrum corresponding to a desired temporal intensity waveform will be described in detail. The desired temporal intensity waveform is represented as a function in the time domain, and the phase spectrum and the intensity spectrum are represented as functions in the frequency domain. Therefore, the phase spectrum and the intensity spectrum corresponding to the desired temporal intensity waveform are obtained by an iterative Fourier transform based on the desired temporal intensity waveform. In the method described below, the phase spectrum and the intensity spectrum are calculated using an iterative Fourier transform method. Therefore, as illustrated in FIG. 1, the phase spectrum design unit 22 has an iterative Fourier transform unit 22a. Further, the intensity spectrum design unit 23 has an iterative Fourier transform unit 23a.

Figure 7:
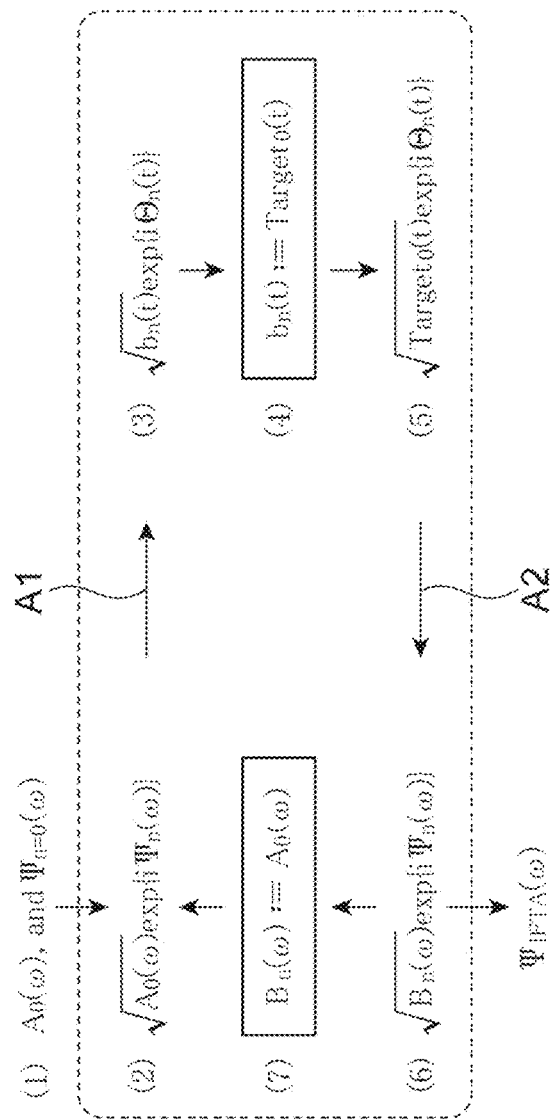
FIG. 7 is a diagram illustrating a phase spectrum calculation procedure by a normal iterative Fourier method as a first comparative example.

However, in a normal iterative Fourier method, a solution may be led to a local solution, and the solution is not necessarily an optimal solution. Further, there are problems in that it takes long time to converge the calculation (that is, the number of iterations increases), and the intensity loss increases. FIG. 7 illustrates a phase spectrum calculation procedure by the normal iterative Fourier method, as a first comparative example for the present embodiment.

First, an initial intensity spectrum function $A_0(\omega)$ and a phase spectrum function $\Psi_{n=0}(\omega)$ to be functions of a frequency $\omega$ are prepared (process number (1) in the drawing). In one example, the intensity spectrum function $A_0(\omega)$ and the phase spectrum function $\Psi_{n=0}(\omega)$ represent the intensity spectrum and the phase spectrum of the input light La, respectively. Next, a waveform function (a) in the frequency domain including the intensity spectrum function $A_0(\omega)$ and the phase spectrum function $\Psi_n(\omega)$ is prepared (process number (2) in the drawing).

$$\sqrt{A_0(\omega)}\exp\{i\Psi_n(\omega)\} \tag{a}$$

A subscript n represents after an n-th Fourier transform process. Before a first Fourier transform process, the initial phase spectrum function $\Psi_{n=0}(\omega)$ described above is used as the phase spectrum function $\Psi_n(\omega)$. i is an imaginary number.

Next, a Fourier transform from the frequency domain to the time domain is performed on the function (a) (arrow A1 in the drawing). As a result, a waveform function (b) in the frequency domain including a temporal intensity waveform function $b_n(t)$ is obtained (process number (3) in the drawing).

$$\sqrt{b_n(t)}\exp\{i\Theta_n(t)\} \tag{b}$$

Next, the temporal intensity waveform function $b_n(t)$ included in the function (b) is replaced by $Target_0(t)$ based on the desired waveform (process numbers (4) and (5) in the drawing).

$$b_n(t):=Target_0(t) \tag{c}$$

$$\sqrt{Target_0(t)}\exp\{i\Theta_n(t)\} \tag{d}$$

Next, an inverse Fourier transform from the time domain to the frequency domain is performed on the function (d) (arrow A2 in the drawing). As a result, a waveform function (e) in the frequency domain including an intensity spectrum function $B_n(\omega)$ and the phase spectrum function $\Psi_n(\omega)$ is obtained (process number (6) in the drawing).

$$\sqrt{B_n(\omega)}\exp\{i\Psi_n(\omega)\} \tag{e}$$

Next, to constrain the intensity spectrum function $B_n(\omega)$ included in the function (e), this is replaced by the initial intensity spectrum function $A_0(\omega)$ (process number (7) in the drawing).

$$B_n(\omega):=A_0(\omega) \tag{f}$$

Subsequently, the above processes (1) to (7) are repeatedly performed a plurality of times, so that the phase spectrum shape represented by the phase spectrum function $\Psi_n(\omega)$ in the waveform function can be brought closer to a phase spectrum shape corresponding to the desired temporal intensity waveform. A phase spectrum function $\Psi_{IFTA}(\omega)$ to be finally obtained is used for calculating the modulation pattern.

Figure 8:
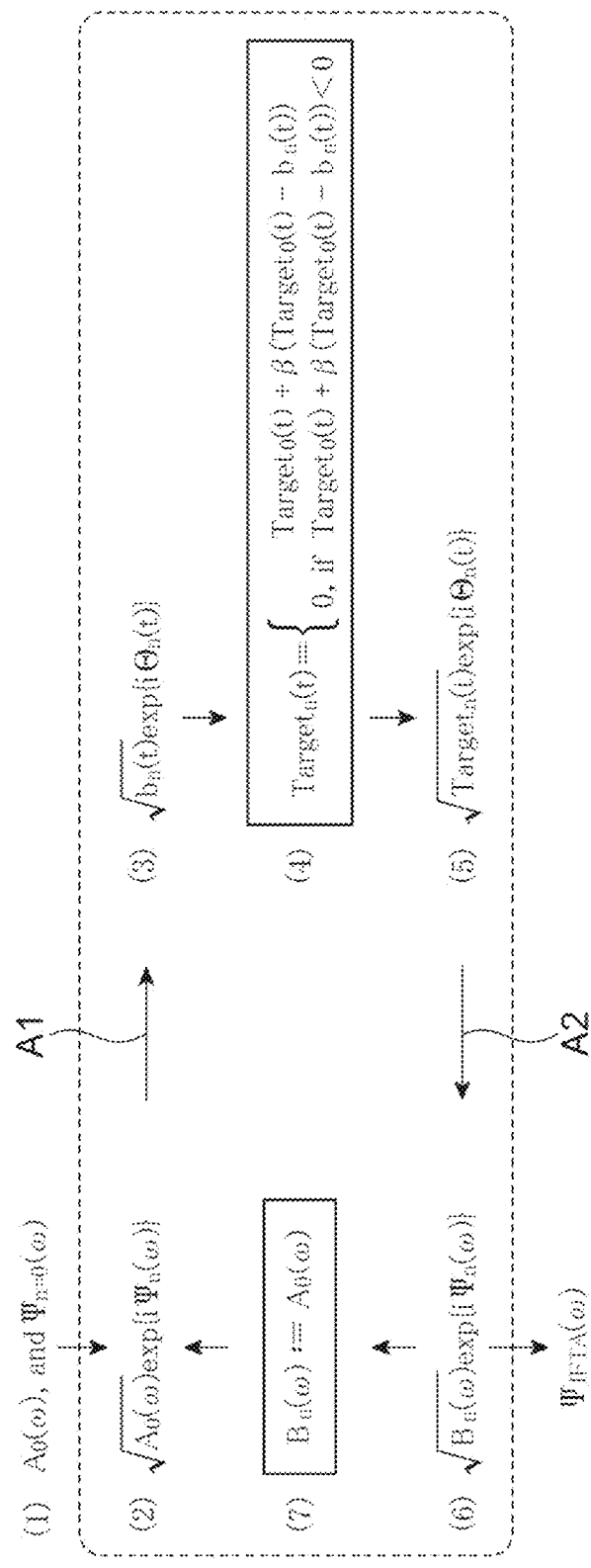
FIG. 8 is a diagram illustrating a phase spectrum calculation procedure by an iterative Fourier method described in Non Patent Document 2 as a second comparative example.

For the normal iterative Fourier method described above, a process for preventing a solution from being led to a local solution is included in a method described in Non Patent Document 2. FIG. 8 illustrates a phase spectrum calculation procedure by an iterative Fourier method (hereinafter, referred to as IFTA-Fienup) described in Non Patent Document 2, as a second comparative example for the present embodiment. In addition, in FIG. 8, because the processes (1) to (3) and (6) and (7) are the same as those in the method described above, the description thereof is omitted.

In IFTA-Fienup, when processes (4) and (5) are executed, that is, a replacement based on a desired waveform is performed on the temporal intensity waveform function $b_n(t)$ included in the function (b) after the Fourier transform, instead of $Target_0(t)$, $Target_n(t)$ calculated by the following formula (g) is used (process numbers (4) and (5) in the drawing).

$$Target_n(t) = \begin{cases} Target_0(t) + \beta(Target_0(t) - b_n(t)) \\ 0, \text{ if } Target_0(t) + \beta(Target_0(t) - b_n(t)) < 0 \end{cases} \tag{g}$$

$$\sqrt{Target_n(t)}\exp\{i\Theta_n(t)\} \tag{h}$$

In addition, in the above formula (g), a difference ($Target_0(t) - b_n(t)$) between the function $Target_0(t)$ representing the desired waveform and the waveform function $b_n(t)$ after the Fourier transform is multiplied by a predetermined coefficient $\beta$, and a result thereof is added to the desired waveform $Target_0(t)$, so that $Target_n(t)$ is calculated. Further, when this value is smaller than 0, $Target_n(t)=0$ is set.

However, even in IFTA-Fienup, for example, when the function $Target_0(t)$ representing the desired waveform and the waveform function $b_n(t)$ after the Fourier transform are greatly different from each other, a solution may still be led to a local solution.

Figure 9:
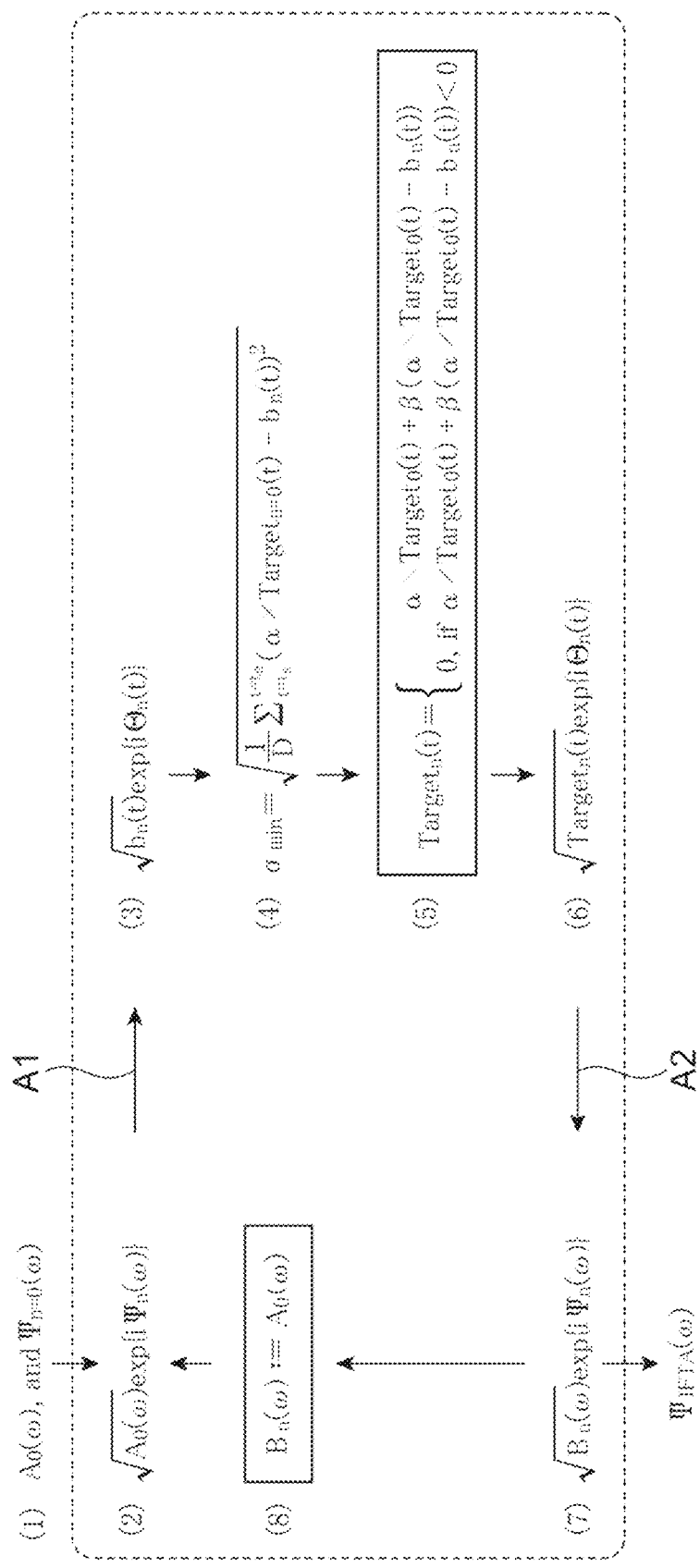
FIG. 9 is a diagram illustrating a phase spectrum calculation procedure described in Patent Document 1.

Therefore, in the method described in Patent Document 1, the iterative Fourier method is further improved as described below. FIG. 9 illustrates the phase spectrum calculation procedure described in Patent Document 1. First, an initial intensity spectrum function $A_0(\omega)$ and a phase spectrum function $\Psi_{n=0}(\omega)$ to be functions of a frequency co are prepared (process number (1) in the drawing). In one example, the intensity spectrum function $A_0(\omega)$ and the phase spectrum function $\Psi_{n=0}(\omega)$ represent the intensity spectrum and the phase spectrum of the input light, respectively.

Next, a waveform function (i) in the frequency domain including the intensity spectrum function $A_0(\omega)$ and the phase spectrum function $\Psi_n(\omega)$ is prepared (process number (2) in the drawing).

$$\sqrt{A_0(\omega)}\exp\{i\Psi_n(\omega)\} \quad (i)$$

A subscript n represents after an n-th Fourier transform process. Before a first Fourier transform process, the initial phase spectrum function $\Psi_{n=0}(\omega)$ described above is used as the phase spectrum function $\Psi_n(\omega)$. i is an imaginary number.

Next, a Fourier transform from the frequency domain to the time domain is performed on the function (i). As a result, a waveform function (j) in the frequency domain including a temporal intensity waveform function $b_n(t)$ is obtained (process number (3) in the drawing).

$$\sqrt{b_n(t)}\exp\{i\Theta_n(t)\} \quad (j)$$

Next, a coefficient α with which a difference between the waveform function $b_n(t)$ after the Fourier transform and the function $Target_0(t)$ multiplied by the coefficient α (α×$Target_0(t)$) is smaller than a difference between the waveform function $b_n(t)$ and the function $Target_0(t)$ is obtained (process number (4) in the drawing). In one example, the coefficient α with which a standard deviation σ of α×$Target_0(t)$ for the waveform function $b_n(t)$ after the Fourier transform is minimized ($\sigma_{min}$) is derived by searching using an evaluation function shown by the following formula (k). In addition, in the formula (k), D represents the number of data points, and $t_s$ and $t_e$ represent a start point and an end point of a time axis, respectively.

$$\sigma_{min} = \sqrt{\frac{1}{D}\sum_{t=t_s}^{t=t_e}(\alpha \times Target_{n=0}(t) - b_n(t))^2} \quad (k)$$

Figure 10A:
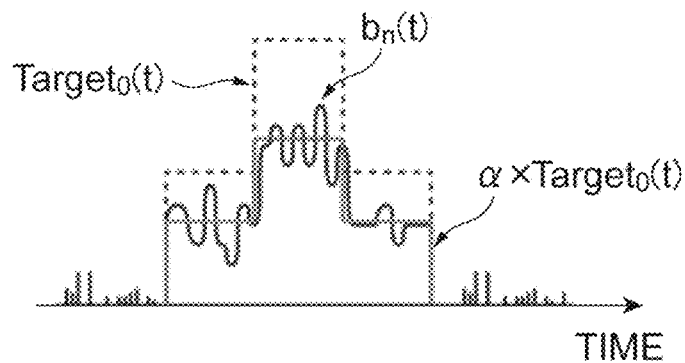
FIG. 10A and FIG. 10B are diagrams for visually explaining a process of a process number (4) in FIG. 9.
Figure 10B:
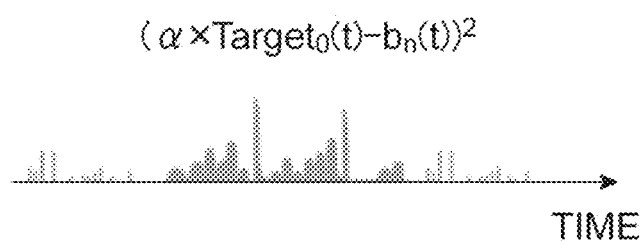

FIG. 10A and FIG. 10B are diagrams for visually explaining the process of the process number (4). FIG. 10A illustrates an example of each of the waveform function $b_n(t)$ after the Fourier transform, the function $Target_0(t)$, and α×$Target_0(t)$ after the multiplication, when the desired waveform is a protruded pulse waveform. Further, FIG. 10B illustrates a graph illustrating a calculation result of (α×$Target_0(t)-b_n(t))^2$ included in the formula (k), corresponding to the example illustrated in FIG. 10A.

Next, a replacement based on the desired waveform is performed on the temporal intensity waveform function $b_n(t)$ included in the function (j) after the Fourier transform (first replacement). At this time, the replacement is performed using the result (α×$Target_0(t)$) of multiplying the function $Target_0(t)$ representing the desired waveform by the coefficient α. In one example, the replacement is performed by $Target_n(t)$ calculated by the formula (m) obtained by replacing $Target_0(t)$ in the formula (g) in IFTA-Fienup described above by α×$Target_0(t)$ (process numbers (5) and (6) in the drawing). In addition, in the formula, β is an arbitrary coefficient, and by appropriately selecting the coefficient β, it can be expected to find a better solution with a small number of iterations n and to prevent a solution from being led to a local solution.

$$Target_n(t) = \begin{cases} \alpha \times Target_0(t) + \beta(\alpha \times Target_0(t) - b_n(t)) & (m) \\ 0, \text{ if } \alpha \times Target_0(t) + \beta(\alpha \times Target_0(t) - b_n(t)) < 0 \end{cases}$$

$$\sqrt{Target_n(t)}\exp\{i\Theta_n(t)\} \quad (n)$$

Next, an inverse Fourier transform from the time domain to the frequency domain is performed on the function (n) (arrow A2 in the drawing). As a result, a waveform function (o) in the frequency domain including the intensity spectrum function $B_n(\omega)$ and the phase spectrum function $\Psi_n(\omega)$ is obtained (process number (7) in the drawing).

$$\sqrt{B_n(\omega)}\exp\{i\Psi_n(\omega)\} \quad (o)$$

Next, to constrain the intensity spectrum function $B_n(\omega)$ included in the function (o), this is replaced by the initial intensity spectrum function $A_0(\omega)$ (second replacement, process number (8) in the drawing).

$$B_n(\omega):=A_0(\omega) \quad (p)$$

Subsequently, the above processes (1) to (8) are repeatedly performed a plurality of times, so that the phase spectrum shape represented by the phase spectrum function $\Psi_n(\omega)$ in the waveform function can be brought closer to a phase spectrum shape corresponding to the desired temporal intensity waveform. A phase spectrum function $\Psi_{IFTA}(\omega)$ to be finally obtained is provided for calculating the modulation pattern.

However, in the method described in Patent Document 1 described above, the evaluation function shown in the formula (k) performs uniform evaluation within a certain time region. That is, a part where the light intensity is relatively low in the temporal waveform of the output light Ld, or a part where only noise exists is evaluated with the same importance as that of a part where the light intensity is high. For this reason, the above method is effective when waveform control in the part where the light intensity is relatively low is important, however, for example, when a utility value of the temporal waveform in the part with the high light intensity is high and the temporal waveform in the part with the low light intensity can be ignored, as in laser processing or a nonlinear optical microscope, the above method is not necessarily an optimal design method.

Figure 11:
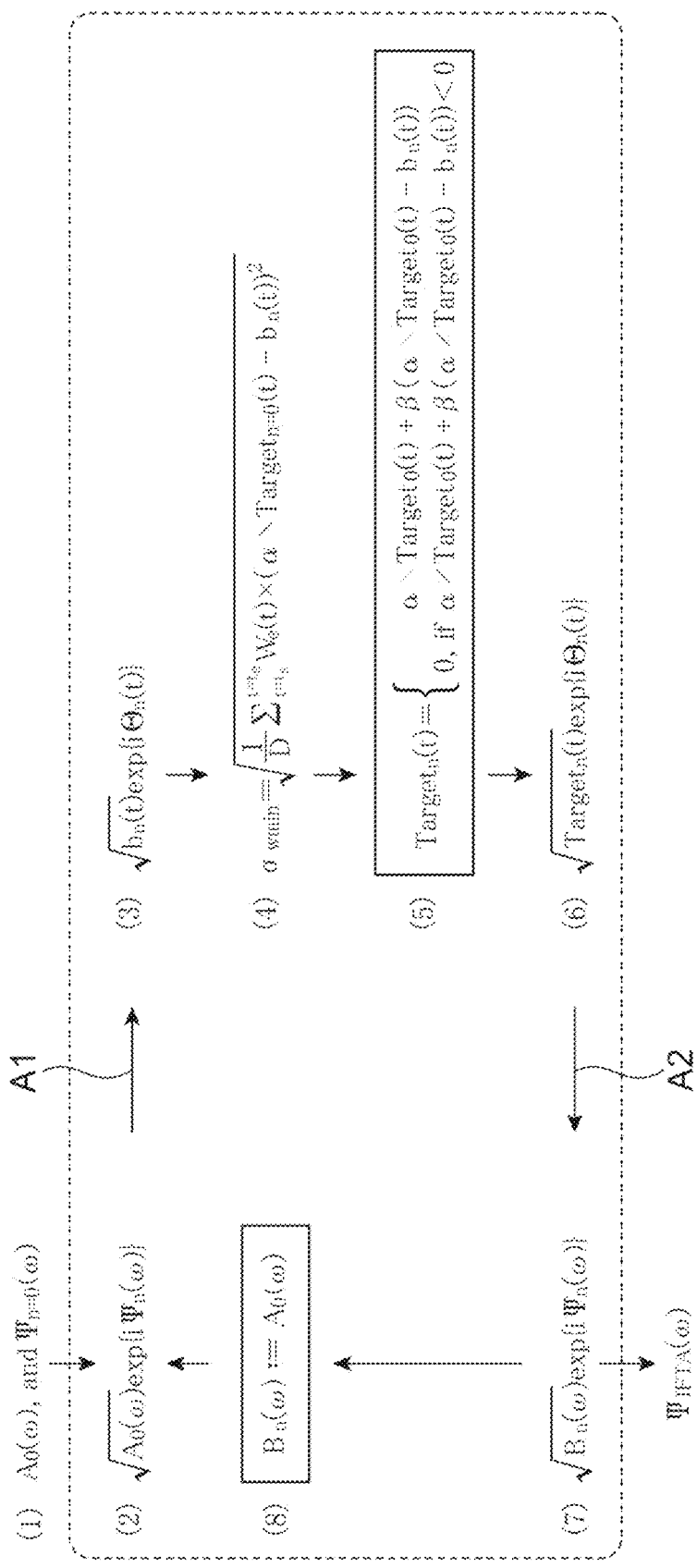
FIG. 11 is a diagram illustrating a phase spectrum calculation procedure by an improved iterative Fourier method in an embodiment.

Therefore, in the iterative Fourier transform unit 22a of the phase spectrum design unit 22 in the present embodiment, an iterative Fourier method is further improved as described below. FIG. 11 illustrates a phase spectrum calculation procedure by an improved iterative Fourier method in the present embodiment. In addition, since the calculation procedure is the same as the calculation procedure illustrated in FIG. 9 in many places, the description thereof will be appropriately omitted.

First, the iterative Fourier transform unit 22a performs the processes of the same process numbers (1) to (3) as those in the calculation procedure illustrated in FIG. 9. Next, the iterative Fourier transform unit 22a obtains a coefficient α having the following features (A) and (B) (process number (4) in the drawing).

(A) A difference (α×$Target_0(t)-b_n(t)$) between the waveform function $b_n(t)$ after the Fourier transform and the function $Target_0(t)$ multiplied by the coefficient α is smaller than a difference (Target$_0$(t)−b$_n$(t)) between the waveform function b$_n$(t) and the function Target$_0$(t). Specifically, a time integral value of the difference (α×Target$_0$(t)−b$_n$(t)) is smaller than a time integral value of the difference (Target$_0$(t)−b$_n$(t)).

(B) At each time of the function Target$_0$(t), a ratio of the difference (α×Target$_0$(t)−b$_n$(t)), that is, a ratio of the difference (α×Target$_0$(t)−b$_n$(t)) based on the intensity value of the function Target$_0$(t) as a reference decreases when the intensity increases.

In one example, the coefficient α with which a pseudo standard deviation σ of α×Target$_0$(t) for the waveform function b$_n$(t) after the Fourier transform is minimized (σ$_{min}$) is derived by searching using an evaluation function shown by the following formula (q). In addition, in the formula (q), D represents the number of data points, and t$_s$ and t$_e$ represent a start point and an end point of a time axis, respectively. Further, We(t) is a first weight function.

$$\sigma_{min} = \sqrt{\frac{1}{D}\sum_{t=t_s}^{t=t_e} We(t) \times (\alpha \times Target_{n=0}(t) - b_n(t))^2} \quad (q)$$

As shown in the formula (q), the evaluation function is a function including the difference (α×Target$_0$(t)−b$_n$(t)) between the waveform function b$_n$(t) after the Fourier transform and the function α×Target$_0$(t) after the multiplication, and specifically, the evaluation function includes (α×Target$_0$(t)−b$_n$(t))$^2$. Further, the evaluation function includes a weight function We(t) by which the function is multiplied, and includes a time integral of a result of multiplying the function by the weight function We(t). Further, the coefficient α with which the evaluation function, that is, the time integral is minimized (σ$_{min}$) is derived by searching.

The weight function We(t) is a function having a larger weight value when the intensity is higher, at each time of the function Target$_0$(t) before the multiplication. In one example, the weight function We(t) includes a function obtained by multiplying the function Target$_0$(t) by another coefficient C$_1$, and is represented by, for example, the following formula (r). In other words, the weight function We(t) may be determined on the basis of the function Target$_0$(t).

$$We(t) = C_1 \cdot Target_0(t) \quad (r)$$

FIG. 12A to FIG. 12C are diagrams for visually explaining the process of the process number (4). FIG. 12A illustrates a weight function We(t) having the same shape as that of Target$_0$(t) illustrated in FIG. 10A as an example of the weight function We(t). FIG. 12B is a graph illustrating a calculation result of (α×Target$_0$(t)−b$_n$(t))$^2$ illustrated in FIG. 10B. FIG. 12C illustrates a graph of a result of multiplying the weight function We(t) illustrated in FIG. 12A by (α×Target$_0$(t)−b$_n$(t))$^2$ illustrated in FIG. 10B.

As illustrated in FIG. 12C, by multiplication of the weight function We(t), the magnitude of a difference is emphasized in a part D1 where the intensity is high in Target$_0$(t), as compared with the other parts. Therefore, at the time of finding the coefficient α satisfying the formula (q), a value with which the difference in the part D1 is particularly reduced is found.

Figure 13:
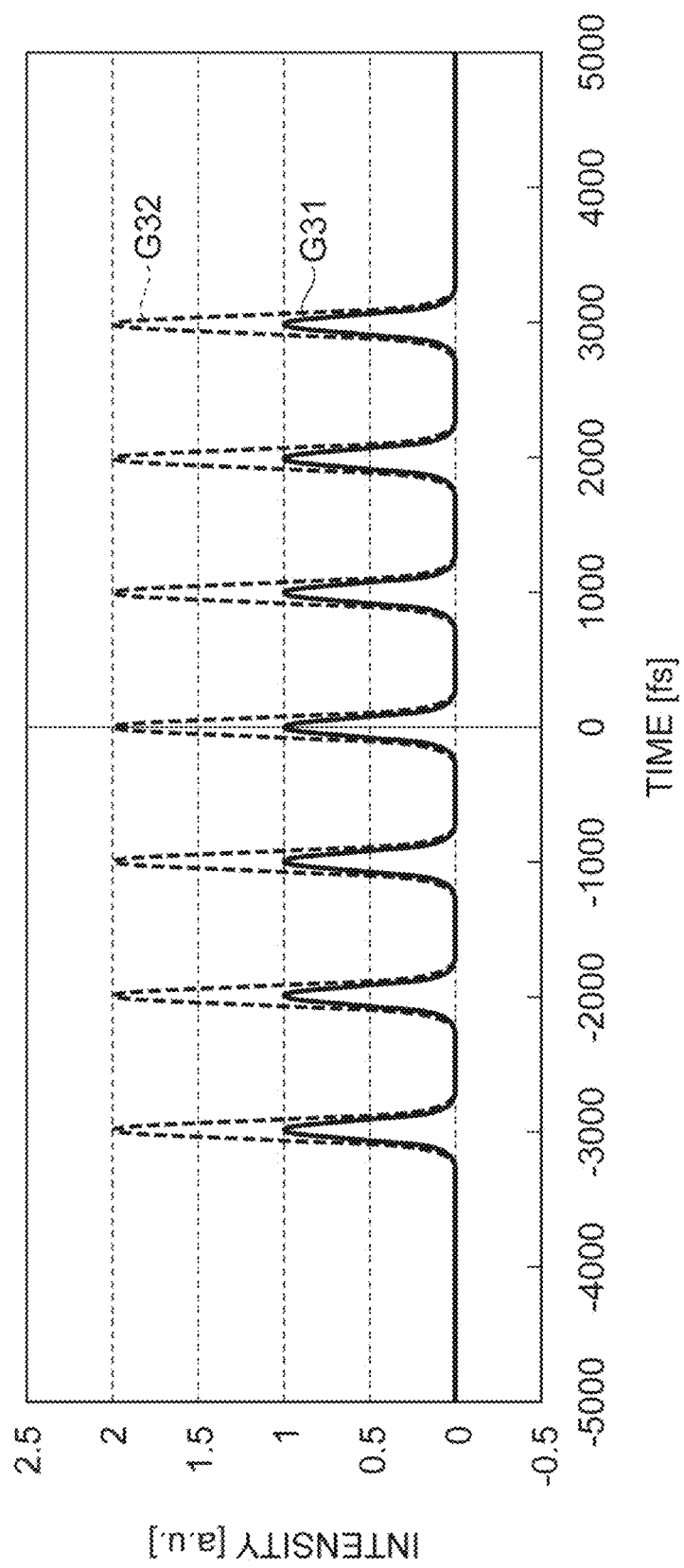
FIG. 13 is a diagram illustrating an example of a weight function We(t) when $Target_0(t)$ is a multi pulse.

As described above, the evaluation function shown in the formula (q) includes the weight function We(t), so that the feature (B) described above can be applied to the coefficient α. In addition, a method and a formula for applying the feature (B) to the coefficient α are not limited to the method and the formula described above. As another example, FIG. 13 illustrates an example of the weight function We(t) when Target$_0$(t) is a multi pulse. A graph G31 in FIG. 13 shows the case where a coefficient C of the formula (r) is 1, and a graph G32 shows the case where the coefficient C of the formula (r) is 2.

Then, the iterative Fourier transform unit 22a performs the processes of the same process numbers (5) to (8) as those in the calculation procedure illustrated in FIG. 9. Subsequently, the above processes (1) to (8) are repeatedly performed a plurality of times, so that a phase spectrum shape represented by the phase spectrum function Ψ$_n$(ω) in the waveform function can be brought closer to a phase spectrum shape corresponding to the desired temporal intensity waveform. A phase spectrum function Ψ$_{IFTA}$(ω) to be finally obtained is provided to the modulation pattern generation unit 24.

Figure 14:
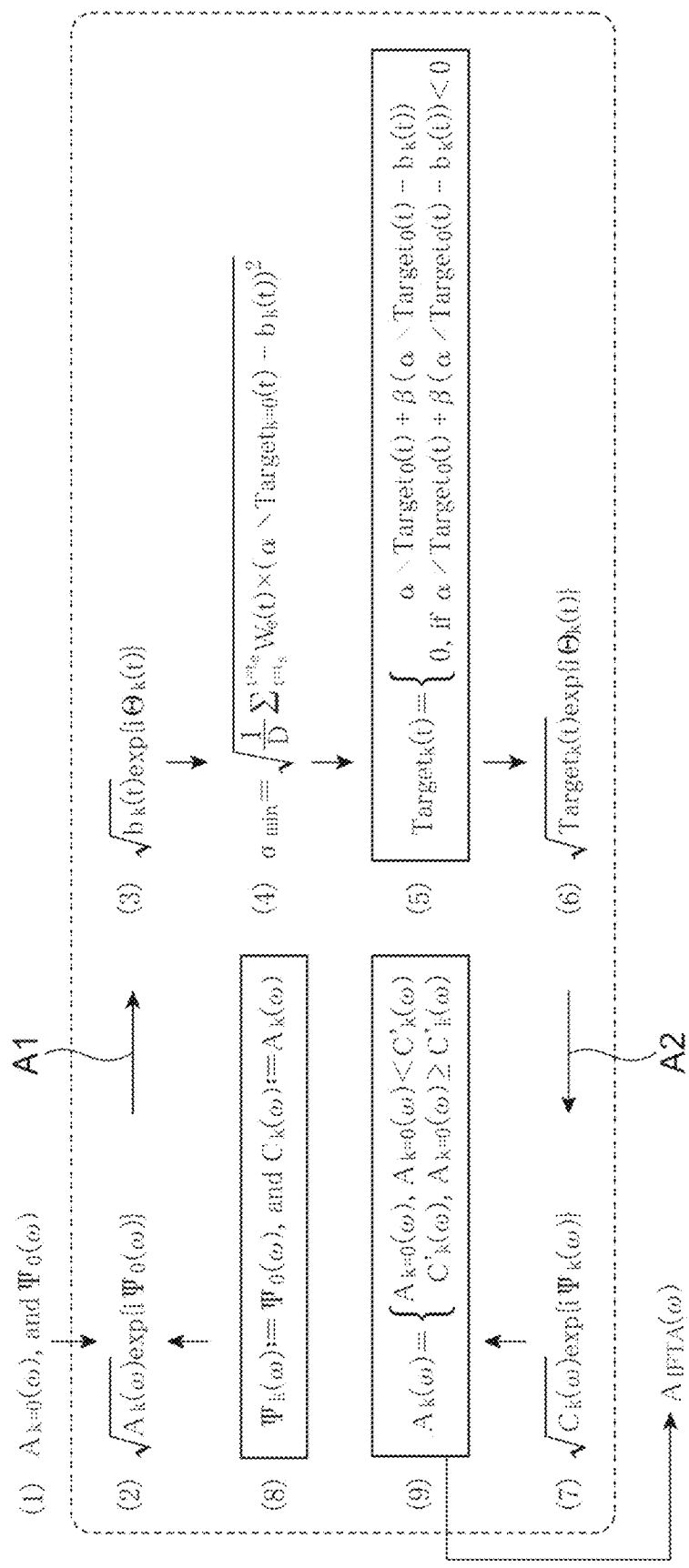
FIG. 14 is a diagram illustrating a calculation procedure in an iterative Fourier transform unit of an intensity spectrum design unit.

FIG. 14 illustrates a calculation procedure in the iterative Fourier transform unit 23a of the intensity spectrum design unit 23. The iterative Fourier transform unit 23a calculates an intensity spectrum by the similar method as the calculation method by the iterative Fourier transform unit 22a described above.

First, the iterative Fourier transform unit 23a prepares an initial intensity spectrum function A$_{k=0}$(ω) and a phase spectrum function Ψ$_n$(ω) in the same manner as when the phase spectrum is calculated (process number (1) in the drawing). Next, the iterative Fourier transform unit 23a prepares a waveform function (s) of a frequency domain including the intensity spectrum function A$_k$(ω) and the phase spectrum function Ψ$_n$(ω) (process number (2) in the drawing).

$$\sqrt{A_k(\omega)}\exp\{i\Psi_0(\omega)\} \quad (s)$$

A subscript k represents after a k-th Fourier transform process. Before a first Fourier transform process, the initial intensity spectrum function A$_{k=0}$(ω) described above is used as the intensity spectrum function A$_k$(ω). i is an imaginary number.

Next, the iterative Fourier transform unit 23a performs the Fourier transform from the frequency domain to the time domain on the function (s). As a result, a waveform function (t) in the frequency domain including the temporal intensity waveform function b$_k$(t) is obtained (process number (3) in the drawing).

$$\sqrt{b_k(t)}\exp\{i\Theta_k(t)\} \quad (t)$$

Next, the iterative Fourier transform unit 23a obtains a coefficient α having the following features (C) and (D) (process number (4) in the drawing).

(C) A difference (α×Target$_0$(t)−b$_k$(t)) between the waveform function b$_k$(t) after the Fourier transform and the function Target$_0$(t) multiplied by the coefficient α is smaller than a difference (Target$_0$(t)−b$_k$(t)) between the waveform function b$_k$(t) and the function Target$_0$(t). Specifically, a time integral value of the difference (α×Target$_0$(t)−b$_k$(t)) is smaller than a time integral value of the difference (Target$_0$(t)−b$_k$(t)).

(D) At each time of the function Target$_0$(t), a ratio of the difference (α×Target$_0$(t)−b$_k$(t)), that is, a ratio of the difference (α×Target$_0$(t)−b$_k$(t)) based on the intensity value of the function Target$_0$(t) as a reference decreases when the intensity increases.

In one example, the coefficient α with which a pseudo standard deviation σ of α×Target$_0$(t) for the waveform function b$_k$(t) after the Fourier transform is minimized (σ$_{min}$) is derived by searching using an evaluation function shown by the following formula (u). In addition, in the formula (u), D represents the number of data points, and $t_s$ and $t_e$ represent a start point and an end point of a time axis, respectively. Further, We(t) is a first weight function.

$$\sigma_{min} = \sqrt{\frac{1}{D}\sum_{t=t_s}^{t=t_e} We(t) \times (\alpha \times \text{Target}_{k=0}(t) - b_k(t))^2} \quad (u)$$

As shown in the formula (u), the evaluation function is a function including a difference ($\alpha \times \text{Target}_0(t) - b_k(t)$) between the waveform function $b_k(t)$ after the Fourier transform and the function $\alpha \times \text{Target}_0(t)$ after the multiplication, and specifically, the evaluation function includes ($\alpha \times \text{Target}_0(t) - b_k(t))^2$. Further, the evaluation function includes a weight function We(t) by which the function is multiplied, and includes a time integral of a result of multiplying the function by the weight function We(t). Further, the coefficient $\alpha$ with which the evaluation function, that is, the time integral is minimized ($\sigma_{min}$) is derived by searching.

In addition, the features and the specific examples of the weight function We(t) are the same as those in the case of calculating the phase spectrum function described above (refer to the formulas (q) and (r)). In addition, the following formula (v) is used instead of the formula (q) described above.

$$\sigma_{min} = \sqrt{\frac{1}{D}\sum_{t=t_s}^{t=t_e} We(t) \times (\alpha \times \text{Target}_{k=0}(t) - b_k(t))^2} \quad (v)$$

Next, the iterative Fourier transform unit 23a performs a replacement based on the desired waveform on the temporal intensity waveform function $b_k(t)$ included in the function (t) after the Fourier transform (first replacement). At this time, the iterative Fourier transform unit 23a performs the replacement using a result ($\alpha \times \text{Target}_0(t)$) of multiplying the function $\text{Target}_0(t)$ representing the desired waveform by the coefficient $\alpha$. In one example, the function is replaced by $\text{Target}_k(t)$ calculated by the formula ($\omega$) (process numbers (5) and (6) in the drawing).

$$\text{Target}_k(t) = \begin{cases} \alpha \times \text{Target}_0(t) + \beta(\alpha \times \text{Target}_0(t) - b_k(t)) \\ 0, \text{ if } \alpha \times \text{Target}_0(t) + \beta(\alpha \times \text{Target}_0(t) - b_k(t)) < 0 \end{cases} \quad (w)$$

$$\sqrt{\text{Target}_k(t)} \exp\{i\Theta_k(t)\} \quad (x)$$

Next, the iterative Fourier transform unit 23a performs an inverse Fourier transform from the time domain to the frequency domain on the function (x). As a result, a waveform function (y) in the frequency domain including the intensity spectrum function $C_k(\omega)$ and the phase spectrum function $\Psi_k(\omega)$ is obtained (process number (7) in the drawing).

$$\sqrt{C_k(\omega)}\exp\{i\Psi_k(\omega)\} \quad (y)$$

Next, to constrain the phase spectrum function $\Psi_k(\omega)$ included in the function (y), the iterative Fourier transform unit 23a replaces the function by the initial phase spectrum function $\Psi_0(\omega)$ (second replacement, process number (8) in the drawing).

$$\Psi_k(\omega) := \Psi_0(\omega) \quad (z)$$

Further, the iterative Fourier transform unit 23a performs a filter process based on the intensity spectrum of the input light La on the intensity spectrum function $C_k(\omega)$ in the frequency domain after the inverse Fourier transform. Specifically, a portion exceeding a cutoff intensity for each wavelength, which is determined on the basis of the intensity spectrum of the input light La, is cut from the intensity spectrum represented by the intensity spectrum function $C_k(\omega)$.

In one example, the cutoff intensity for each wavelength is set to be matched with the intensity spectrum of the input light La (initial intensity spectrum function $A_{k=0}(\omega)$ in the present embodiment). In this case, as shown in the following formula (z1), at a frequency where the intensity spectrum function $C_k(\omega)$ is larger than the initial intensity spectrum function $A_{k=0}(\omega)$, a value of the initial intensity spectrum function $A_{k=0}(\omega)$ is taken as a value of the intensity spectrum function $A_k(\omega)$. Further, at a frequency where the intensity spectrum function $C_k(\omega)$ is equal to or smaller than the initial intensity spectrum function $A_{k=0}(\omega)$, a value of the intensity spectrum function $C_k(\omega)$ is taken as the value of the intensity spectrum function $A_k(\omega)$.

$$A_k(\omega) = \begin{cases} A_{k=0}(\omega), & A_{k=0}(\omega) < C_k(\omega) \\ C_k(\omega), & A_{k=0}(\omega) \geq C_k(\omega) \end{cases} \quad (z1)$$

The iterative Fourier transform unit 23a replaces the intensity spectrum function $C_k(\omega)$ included in the function (y) by the intensity spectrum function $A_k(\omega)$ after the filter process according to the formula (z1). Further, a method for relatively changing the cutoff intensity by defining a function C'k($\omega$) obtained by multiplying $C_k(\omega)$ by an arbitrary coefficient may be used (process number (9) in the drawing).

Subsequently, the iterative Fourier transform unit 23a repeatedly performs the above processes (1) to (8) (or (1) to (9)) a plurality of times, so that the intensity spectrum shape represented by the intensity spectrum function $A_k(\omega)$ in the waveform function can be brought closer to an intensity spectrum shape corresponding to the desired temporal intensity waveform. An intensity spectrum function $A_{IFTA}(\omega)$ to be finally obtained is provided to the modulation pattern generation unit 24.

Figure 15:
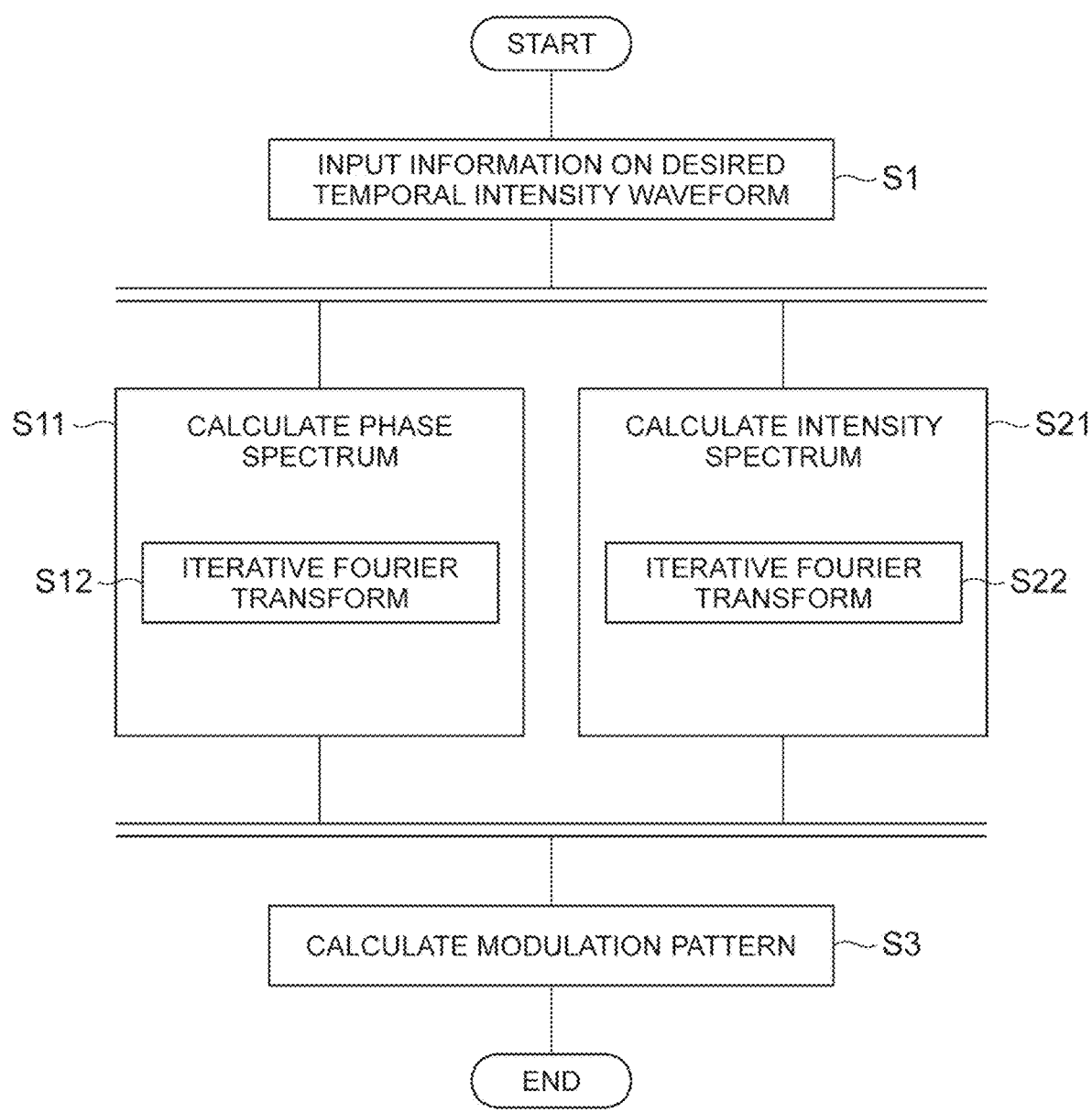
FIG. 15 is a flowchart illustrating a modulation pattern calculation method.

FIG. 15 is a flowchart illustrating a modulation pattern calculation method realized by the modulation pattern calculation apparatus 20 described above. In addition, modulation pattern calculation program described above causes the processor 201 (refer to FIG. 6) of the computer to execute each step included in the flowchart.

As illustrated in FIG. 15, first, information on a desired temporal intensity waveform is input to the arbitrary waveform input unit 21 by the operator (input step S1). Next, a phase spectrum and an intensity spectrum to bring the temporal intensity waveform close to a desired waveform are calculated respectively in the phase spectrum design unit 22 and the intensity spectrum design unit 23 (phase spectrum calculation step S11 and intensity spectrum calculation step S21).

The phase spectrum calculation step S11 includes an iterative Fourier transform step S12 by the iterative Fourier transform unit 22a. The details of the iterative Fourier transform step S12 are the same as the operation of the iterative Fourier transform unit 22a described above. The phase spectrum function $\Psi_{IFTA}(\omega)$ to be finally obtained is provided to a subsequent modulation pattern calculation step S3. Further, the intensity spectrum calculation step S21 includes an iterative Fourier transform step S22 by the iterative Fourier transform unit 23a. The details of the iterative Fourier transform step S22 are the same as the operation of the iterative Fourier transform unit 23a described above. The intensity spectrum function $A_{IFTA}(\omega)$ to be finally obtained is provided to the subsequent modulation pattern calculation step S3.

In the modulation pattern calculation step S3 (data generation step), a modulation pattern is calculated on the basis of the phase spectrum function $\Psi_{IFTA}(\omega)$ and the intensity spectrum function $A_{IFTA}(\omega)$. The modulation pattern is presented on the SLM 14.

The effects obtained by the modulation pattern calculation apparatus 20, the modulation pattern calculation method, and the modulation pattern calculation program according to the present embodiment described above will be described.

In the present embodiment, the phase spectrum and the intensity spectrum for bringing the temporal intensity waveform of light closer to the desired waveform are calculated in the iterative Fourier transform units 22a and 23a (or the iterative Fourier transform steps S12 and S22), respectively. At this time, when a replacement based on the desired waveform is performed on the temporal intensity waveform function $b_n(t)$ (or $b_k(t)$) in the time domain obtained by the Fourier transform, a result of multiplying the function $Target_0(t)$ representing the desired waveform by the coefficient α is used. The coefficient α has a value with which a difference between the function $α×Target_0(t)$ after the multiplication of the coefficient α and the temporal intensity waveform function $b_n(t)$ (or $b_k(t)$) after the Fourier transform decreases, as compared with that before the multiplication of the coefficient α.

As a result, a difference ($Target_0(t)-b_n(t)$ or $Target_k(t)-b_k(t)$) between the function before the replacement (that is, the temporal intensity waveform function $b_n(t)$ or $b_k(t)$ after the Fourier transform) and the function $Target_0(t)$ (or $Target_k(t)$) after the replacement based on the desired waveform decreases, so that a solution is prevented from being led to a local solution. Therefore, according to the present embodiment, it is possible to accurately calculate the intensity spectrum and the phase spectrum for bringing the temporal waveform of light closer to the desired waveform.

In particular, when the intensity spectrum function $A_{IFTA}(\omega)$ is derived by the iterative Fourier method, the intensity spectrum after the inverse Fourier transform may exceed the intensity spectrum of the input light La depending on a wavelength region. In such a case, since realization is impossible with respect to a portion exceeding the intensity spectrum of the input light La, an intensity loss occurs with the iterative calculation, and the intensity of the temporal intensity waveform $b_n(t)$ gradually decreases. Therefore, in the conventional iterative Fourier method, a difference between the waveform $Target_0(t)$ after the replacement and the temporal intensity waveform $b_n(t)$ (or $b_k(t)$) tends to be large, and the risk of being led to a local solution increases.

Meanwhile, according to the present embodiment, since the difference between the waveform function $Target_0(t)$ (or $Target_k(t)$) after the replacement and the temporal intensity waveform $b_n(t)$ (or $b_k(t)$) can be reduced, it is possible to reduce the risk of being led to the local solution while suppressing the intensity loss.

Further, in the present embodiment, the coefficient α by which the function $Target_0(t)$ is multiplied has a value with which a ratio of the difference ($Target_0(t)-b_n(t)$ or $Target_k(t)-b_k(t)$) is smaller when the intensity is higher, at each time of the function $Target_0(t)$ before the multiplication. That is, by multiplication of the coefficient α, in a part with the high intensity in the function $Target_0(t)$, the difference ($Target_0(t)-b_n(t)$ or $Target_k(t)-b_k(t)$) between the function $b_n(t)$ (or $b_k(t)$) before the replacement and the function $Target_0(t)$ (or $Target_k(t)$) after the replacement becomes smaller. Therefore, the phase spectrum and the intensity spectrum can be calculated with higher accuracy. For this reason, the temporal waveform in the part where the light intensity is high particularly in the temporal waveform of the output light Ld can be brought closer to the desired waveform with higher accuracy.

Further, as in the present embodiment, the iterative Fourier transform units 22a and 23a (in the iterative Fourier transform steps S12 and S22) may repeatedly perform the Fourier transform, the first replacement, the inverse Fourier transform, and the second replacement, and the modulation pattern generation unit 24 (in the modulation pattern calculation step S3) may calculate the modulation pattern on the basis of the phase spectrum function $\Psi_{IFTA}(\omega)$ and the intensity spectrum function $A_{IFTA}(\omega)$ obtained after the repetition. As described above, by repeatedly performing the iterative Fourier transform, the intensity spectrum $A_{IFTA}(\omega)$ and the phase spectrum $\Psi_{IFTA}(\omega)$ for bringing the temporal intensity waveform of light closer to the desired waveform can be calculated with higher accuracy.

Further, as shown in the above formulas (q) and (v), the coefficient α may have a value with which a time integral value of a result of multiplying a function including the difference between the temporal intensity waveform function $b_n(t)$ (or $b_k(t)$) after the Fourier transform and the function $α×Target_0(t)$ by the weight function We(t) having a larger weight value when the intensity is higher at each time of the function $Target_0(t)$ is minimized. As a result, the difference between the function $α×Target_0(t)$ and the temporal intensity waveform function $b_n(t)$ (or $b_k(t)$) after the Fourier transform in the part where the intensity is high in the desired temporal intensity waveform can be selectively reduced, and the temporal waveform in the part with the high light intensity can be brought closer to the desired waveform with higher accuracy.

Further, as shown in the formula (r) described above, the weight function We(t) may include a function obtained by multiplying the function $Target_0(t)$ by another coefficient C. For example, with such a configuration, it is possible to appropriately determine the weight function We(t) having a larger weight value when the intensity is higher at each time of the function $Target_0(t)$.

Further, the light control apparatus 1A of the present embodiment includes the light source 2 that outputs the input light La, the diffraction grating 12 that functions as the dispersive element spectrally dispersing the input light La, the SLM 14 that modulates the light Lb after the dispersion and outputs modulated light, and the lens that functions as the optical system focusing the modulated light Lc. Further, the SLM 14 modulates the input light La on the basis of the data created by the modulation pattern calculation apparatus 20. According to the light control apparatus 1A, it is possible to calculate an intensity spectrum and a phase spectrum to bring a temporal waveform in a part with a high light intensity particularly in a temporal waveform of the output light Ld closer to a desired waveform with higher accuracy while preventing a solution from being led to a local solution at the time of the iterative Fourier operation.

In addition, in the present embodiment, to bring the temporal intensity waveform closer to the desired waveform, both the phase spectrum function $\Psi_{IFTA}(\omega)$ and the intensity spectrum function $A_{IFTA}(\omega)$ are calculated, and the modulation pattern based on these functions is presented on the SLM 14. However, it is not limited to such a configuration, and for example, only one of the phase spectrum function $\Psi_{IFTA}(\omega)$ and the intensity spectrum function $A_{IFTA}$ (ω) for bringing the temporal intensity waveform closer to the desired waveform may be calculated. In this case, a spectrum prepared (or selected) in advance may be used as the other spectrum, or the other spectrum may not be modulated with the input light La. Even in any configuration, the effects of the present embodiment can be suitably obtained.

Figure 16:
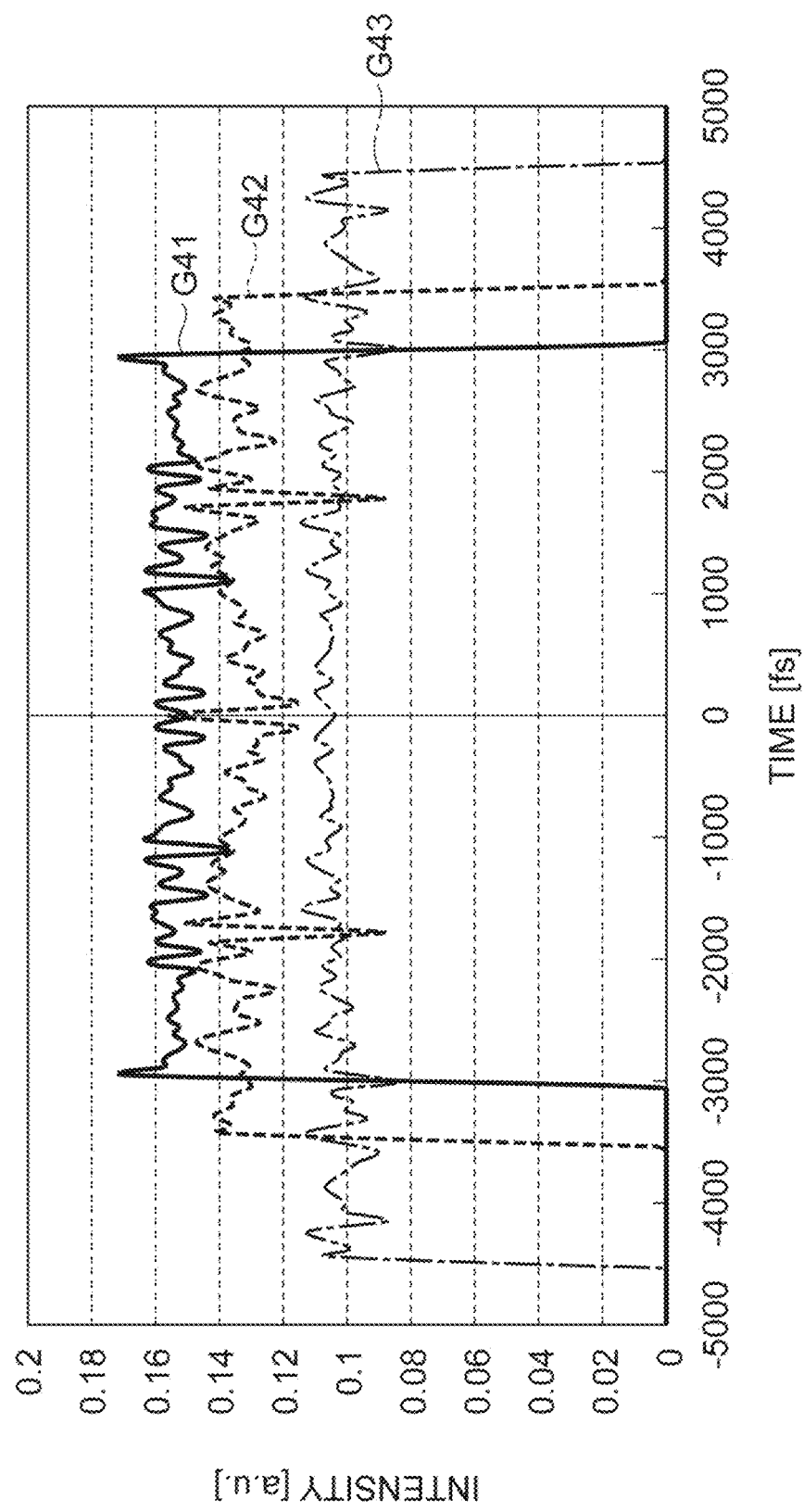
FIG. 16 is a graph illustrating an output temporal waveform when a phase spectrum function $\Psi_{IFTA}(W)$ and an intensity spectrum function $A_{IFTA}(\omega)$ are calculated using a method described in Patent Document 1.
Figure 17:
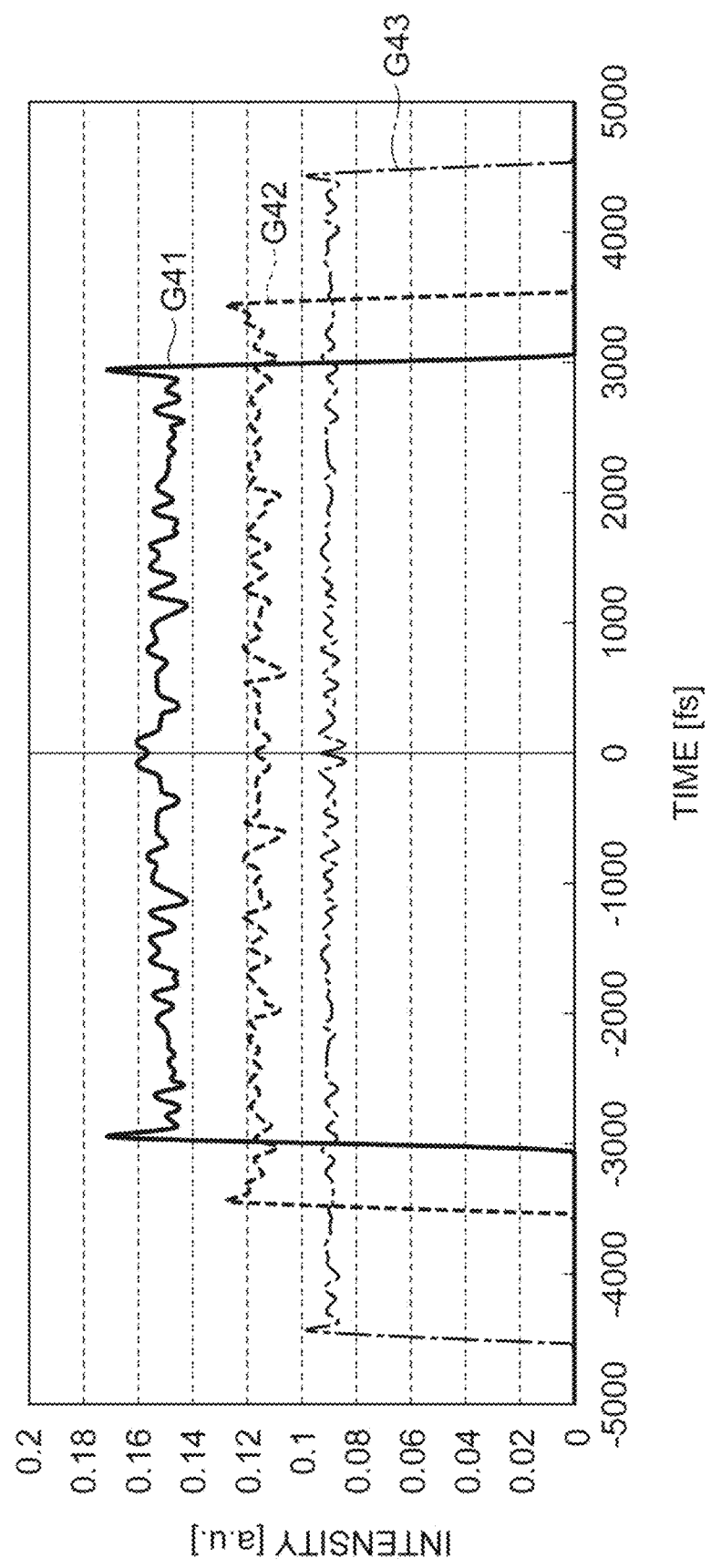
FIG. 17 is a graph illustrating an output temporal waveform when a phase spectrum function $\Psi_{IFTA}(\omega)$ and an intensity spectrum function $A_{IFTA}(\omega)$ are calculated using a method according to an embodiment.

FIG. 16 and FIG. 17 are graphs illustrating output temporal waveforms when the phase spectrum function $\Psi_{IFTA}(\omega)$ and the intensity spectrum function $A_{IFTA}(\omega)$ are calculated using a pulse waveform with a time width of about 135 femtoseconds as the input light La and a rectangular pulse waveform as the desired waveform. FIG. 16 illustrates the case of calculating the functions using the method (refer to FIG. 9) described in Patent Document 1, and FIG. 17 illustrates the case of calculating the functions using the method (refer to FIG. 11 and FIG. 14) of the present embodiment. Further, in these drawings, graphs G41 to G43 show cases where the time width of the rectangular pulse is set as 6 picoseconds, 7 picoseconds, and 9 picoseconds, respectively.

When FIG. 16 and FIG. 17 are compared, it can be seen that a waveform of the present embodiment is smoother in a flat part (top part of the rectangular pulse) where the intensity of the rectangular pulse is high, even in any time width. Further, a standard deviation of the temporal waveform illustrated in FIG. 17 is 1.2 times to a maximum of about 3.4 times smaller than that of the temporal waveform illustrated in FIG. 16. As described above, according to the present embodiment, the temporal waveform in the part with the high light intensity particularly in the temporal waveform of the output light Ld can be brought closer to the desired waveform with higher accuracy.

Further, a pulse waveform having the time width of about 135 femtoseconds is set as the input light La and a multi pulse waveform having a uniform peak value of each pulse is set as a desired waveform, and the phase spectrum function $\Psi_{IFTA}(\omega)$ and the intensity spectrum function $A_{IFTA}(\omega)$ are calculated using the method of the present embodiment (refer to FIG. 11 and FIG. 14) and the method described in Patent Document 1. Here, the standard deviation of the peak value of each pulse is adopted as an evaluation value indicating the uniformity.

Figure 18:
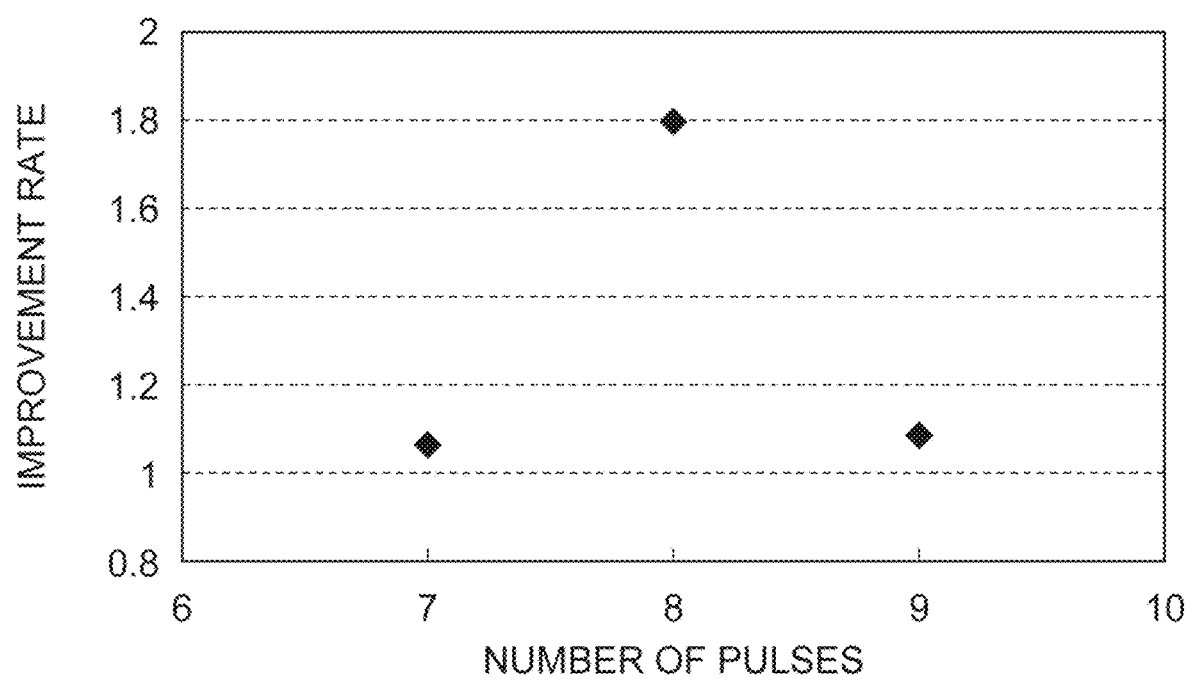
FIG. 18 is a graph illustrating a result of improving the uniformity of peak values by the calculated phase spectrum function $\Psi_{IFTA}(w)$ and intensity spectrum function $A_{IFTA}(\omega)$.

FIG. 18 is a graph illustrating a result of improving the uniformity of peak values by the calculated phase spectrum function $\Psi_{IFTA}(\omega)$ and intensity spectrum function $A_{IFTA}(\omega)$. A horizontal axis represents the number of pulses. A vertical axis represents a ratio (σ2/σ1) between a standard deviation σ1 according to the method of the present embodiment and a standard deviation σ2 according to the method described in Patent Document 1 in order to show a degree of improvement of the uniformity. A value of the ratio exceeds 1 even at any number of pulses, and it is confirmed that the uniformity of the peak values of the respective pulses is improved by the method of the present embodiment.

Figure 19:
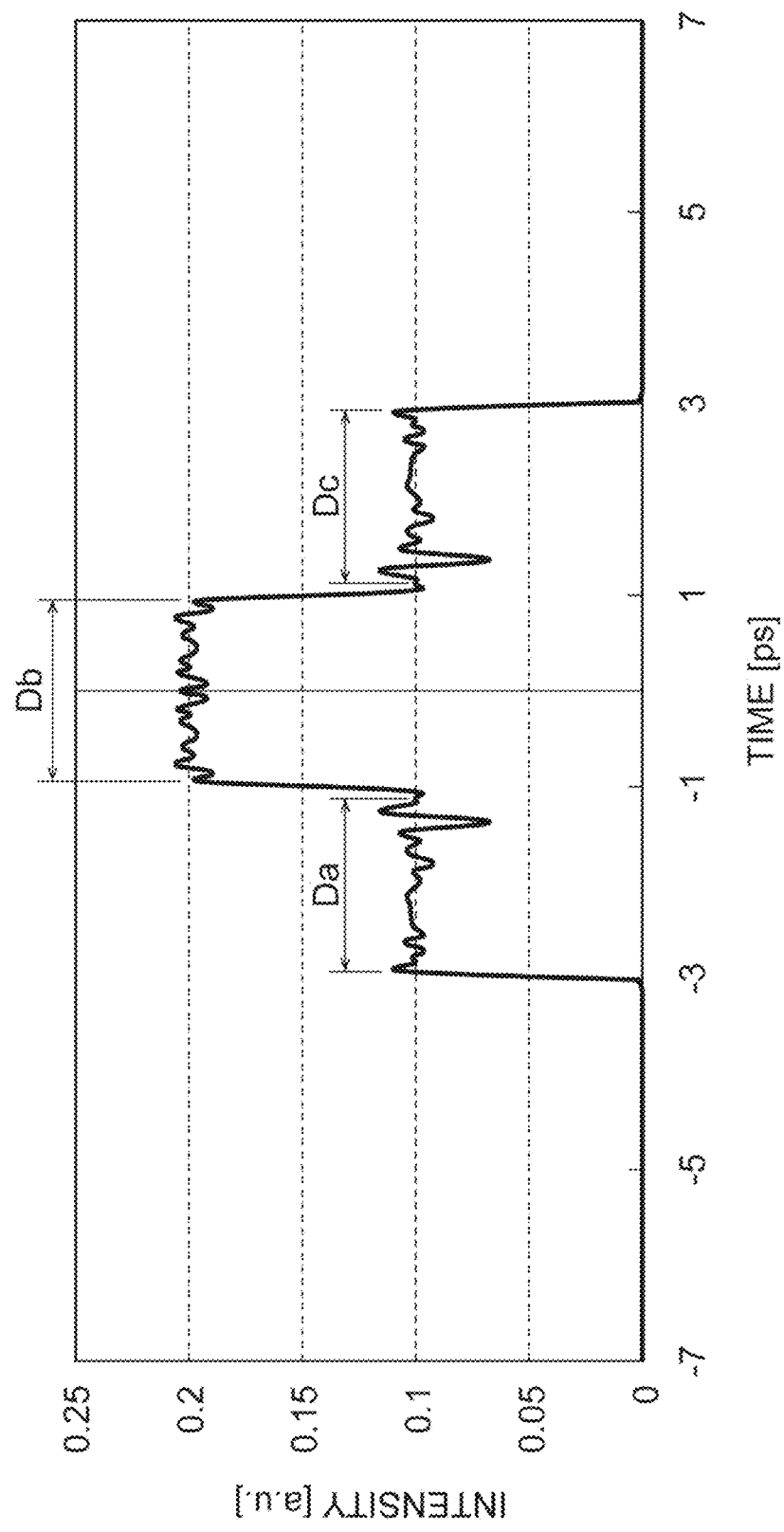
FIG. 19 is a graph illustrating an output temporal waveform when a phase spectrum function $\Psi_{IFTA}(\omega)$ and an intensity spectrum function $A_{IFTA}(\omega)$ are calculated using a method according to an embodiment.

Further, FIG. 19 is a graph illustrating an output temporal waveform when a pulse waveform with a time width of about 135 femtoseconds is set as the input light La, a time shape having two parts Da and Dc of a certain constant intensity and a part Db of a constant intensity located between the two parts Da and Dc and having an intensity higher than that of the parts Da and Dc is set as the desired waveform, and the phase spectrum function $\Psi_{IFTA}(\omega)$ and the intensity spectrum function $A_{IFTA}(\omega)$ are calculated using the method of the present embodiment (refer to FIG. 11 and FIG. 14). In the graph, a standard deviation of an intensity variation in the part Db is improved by about 2.2 times as compared with a standard deviation of an intensity variation in the parts Da and Dc.

Figure 20:
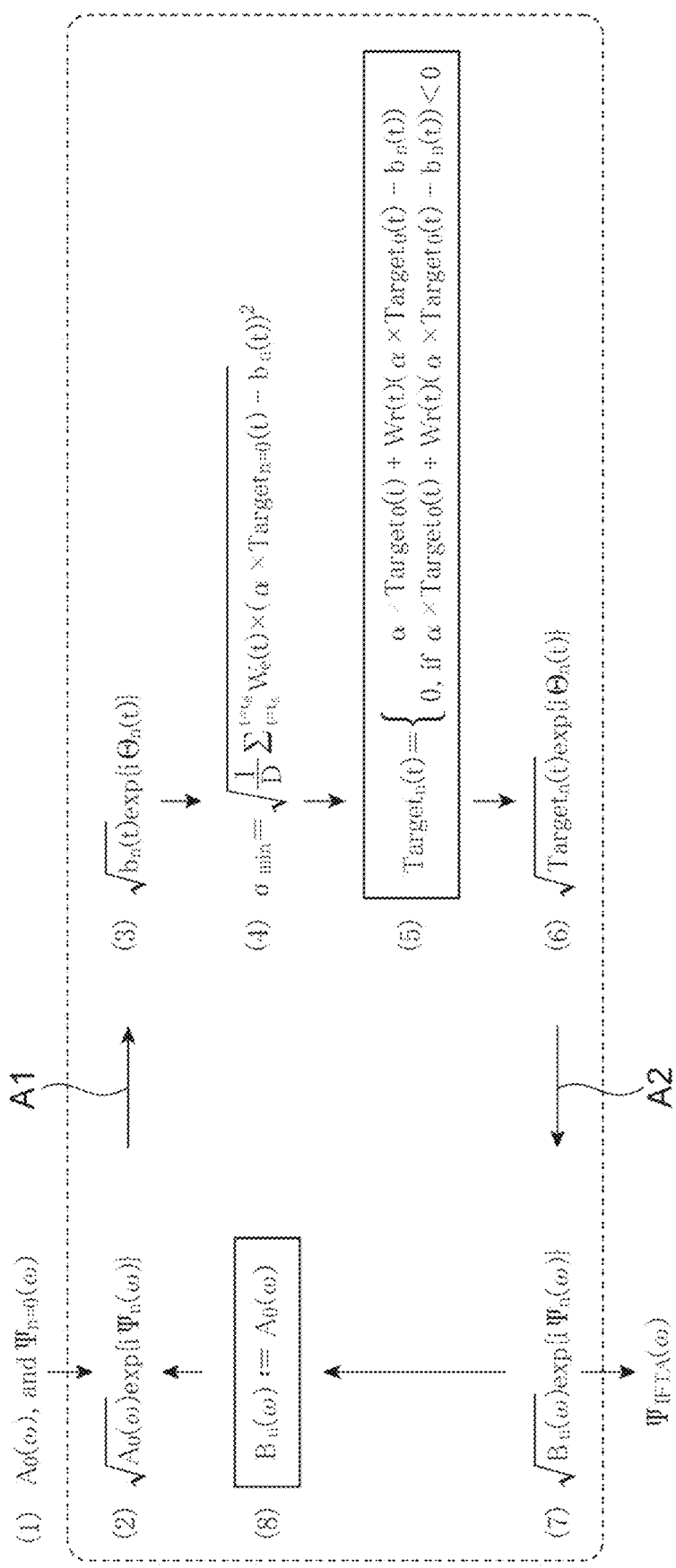
FIG. 20 is a diagram illustrating a phase spectrum calculation procedure by an iterative Fourier method according to a modification.
Figure 21:
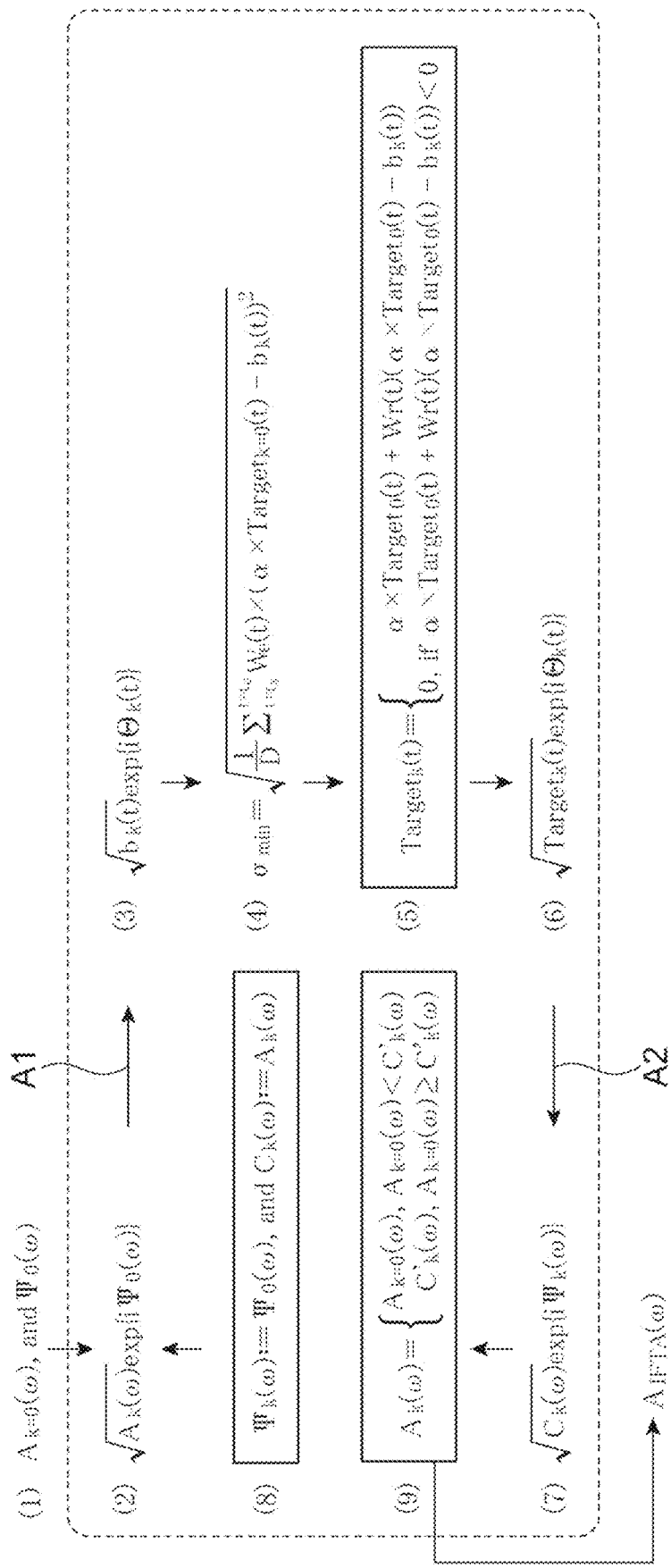
FIG. 21 is a diagram illustrating an intensity spectrum calculation procedure by an iterative Fourier method according to a modification.

FIG. 20 and FIG. 21 are diagrams illustrating a calculation procedure of the phase spectrum and the intensity spectrum by the iterative Fourier method in accordance with a modification of the above embodiment. A difference between the calculation procedure and the calculation procedure of the above embodiment (refer to FIG. 11 and FIG. 14) is that the coefficient β in the process number (5) is replaced by the weight function Wr(t). In the present modification, the formulas (m) and (ω) in the above embodiment are replaced by the following formulas (z2) and (z3), respectively.

$$\text{Target}_n(t) = \begin{cases} \alpha \times \text{Target}_0(t) + Wr(t) \cdot (\alpha \times \text{Target}_0(t) - b_n(t)) & (z2) \\ 0, \text{ if } \alpha \times \text{Target}_0(t) + Wr(t) \cdot (\alpha \times \text{Target}_0(t) - b_n(t)) < 0 \end{cases}$$

$$\text{Target}_k(t) = \begin{cases} \alpha \times \text{Target}_0(t) + Wr(t) \cdot (\alpha \times \text{Target}_0(t) - b_k(t)) & (z3) \\ 0, \text{ if } \alpha \times \text{Target}_0(t) + Wr(t) \cdot (\alpha \times \text{Target}_0(t) - b_k(t)) < 0 \end{cases}$$

That is, in the present modification, the first replacement is performed using the sum of a result of multiplying a function obtained by subtracting the temporal intensity waveform function $b_n(t)$ (or $b_k(t)$) after the Fourier transform from the function $\{\alpha \times \text{Target}_0(t)\}$ by the weight function Wr(t) and the function $\{\alpha \times \text{Target}_0(t)\}$. In addition, the weight function Wr(t) is an example of the second weight function in the present modification.

The weight function Wr(t) is a function having a larger weight value when the intensity is higher, at each time of the function $\text{Target}_0(t)$. In one example, the weight function Wr(t) includes a function obtained by multiplying the function $\text{Target}_0(t)$ by another coefficient $C_2$, and is represented by, for example, the following formula (z4). In other words, the weight function Wr(t) may be determined on the basis of the function $\text{Target}_0(t)$.

$$Wr(t) = C_2 \cdot \text{Target}_0(t) \quad (z4)$$

FIG. 22A to FIG. 22C and FIG. 23A to FIG. 23C are diagrams for visually explaining the process of the process number (5) in the above embodiment and the present modification, respectively.

Figure 22A:
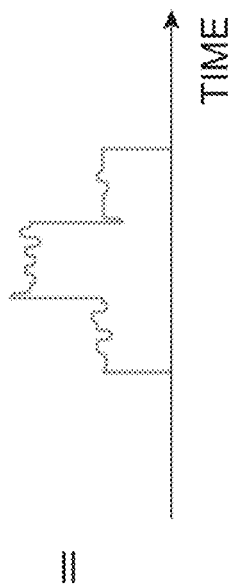
FIG. 22A to FIG. 22C are diagrams for visually explaining a process of a process number (5) in an embodiment.
Figure 22B:

FIG. 22A and FIG. 23A illustrate an example of a calculation result of $\{\alpha \times \text{Target}_0(t)\}$. FIG. 22B illustrates an example of a result of multiplying $\{\alpha \times \text{Target}_0(t) - b_n(t)\}$ by the coefficient β (refer to the formulas (m) and (ω)) of the embodiment, and FIG. 23B illustrates an example of a result of multiplying $\{\alpha \times \text{Target}_0(t) - b_n(t)\}$ by the weight function Wr(t). Further, FIG. 22C illustrates a graph of the sum (that is, $\text{Target}_0(t)$ of the formula (m)) of FIG. 22A and FIG. 22B, and FIG. 23C illustrates a graph of the sum (that is, $\text{Target}_0(t)$ of the formula (z2)) of FIG. 23A and FIG. 23B.

Figure 22C:
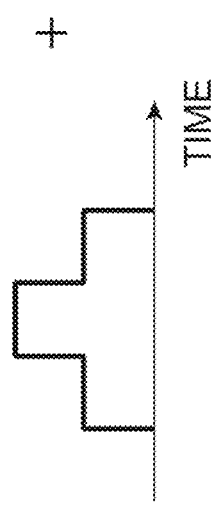

As is clear from comparison of FIG. 22C and FIG. 23C, by replacing the coefficient β by the weight function Wr(t), the magnitude of a difference is emphasized in a part D1 where the intensity is high in $\text{Target}_0(t)$, as compared with the other parts. Therefore, at the time of the iterative Fourier operation, a result that particularly reduces the difference in the part D1 is calculated. Thus, the temporal waveform in the part where the light intensity is high particularly in the temporal waveform of the output light Ld can be brought closer to the desired waveform with higher accuracy.

The data creation apparatus, the light control apparatus, the data creation method, and the data creation program are not limited to the embodiments and the modifications described above, and a variety of other modifications can be made.

For example, in the above embodiment, the case where the coefficient α and the weight function We(t) are applied to IFTA-Fienup (second comparative example) is exemplified, however, the present disclosure is not limited thereto. For example, the coefficient α and the weight function We(t) may be applied to the normal iterative Fourier method according to the first comparative example.

Further, in the above embodiment, the coefficient α with which a difference between the waveform function after the Fourier transform and a result of multiplying the function representing the desired waveform by the coefficient α decreases is obtained by minimizing the standard deviation σ. However, a method for calculating the coefficient α is not limited thereto. For example, the total sum (that is, the time integral value) of the difference values between the waveform function after the Fourier transform and the result of multiplying the function representing the desired waveform by the coefficient α may be minimized.

The data creation apparatus of the above embodiment is an apparatus for creating data for controlling a spatial light modulator, and is configured to include a phase spectrum design unit for generating a phase spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the intensity spectrum function in the frequency domain after the inverse Fourier transform; and a data generation unit for creating the data on the basis of the intensity spectrum function and the phase spectrum function generated by the phase spectrum design unit, and the phase spectrum design unit performs the first replacement using a result of multiplying a function representing the desired temporal intensity waveform by a coefficient, and the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

The data creation method of the above embodiment is a method for creating data for controlling a spatial light modulator, and is configured to include a phase spectrum calculation step of generating a phase spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the intensity spectrum function in the frequency domain after the inverse Fourier transform; and a data generation step of creating the data on the basis of the intensity spectrum function and the phase spectrum function generated in the phase spectrum calculation step, and in the phase spectrum calculation step, the first replacement is performed using a result of multiplying a function representing the desired temporal intensity waveform by a coefficient, and the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

The data creation program of the above embodiment is a program for creating data for controlling a spatial light modulator, and is configured to cause a computer to execute a phase spectrum calculation step of generating a phase spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the intensity spectrum function in the frequency domain after the inverse Fourier transform; and a data generation step of creating the data on the basis of the intensity spectrum function and the phase spectrum function generated in the phase spectrum calculation step, and in the phase spectrum calculation step, the first replacement is performed using a result of multiplying a function representing the desired temporal intensity waveform by a coefficient, and the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

The data creation apparatus of the above embodiment is an apparatus for creating data for controlling a spatial light modulator, and is configured to include an intensity spectrum design unit for generating an intensity spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform; and a data generation unit for creating the data on the basis of the phase spectrum function and the intensity spectrum function generated by the intensity spectrum design unit, and the intensity spectrum design unit performs the first replacement using a result of multiplying a function representing the desired temporal intensity waveform by a coefficient, and the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

The data creation method of the above embodiment is a method for creating data for controlling a spatial light modulator, and is configured to include an intensity spectrum calculation step of generating an intensity spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform; and a data generation step of creating the data on the basis of the phase spectrum function and the intensity spectrum function generated in the intensity spectrum calculation step, and in the intensity spectrum calculation step, the first replacement is performed using a result of multiplying a function representing the desired temporal intensity waveform by a coefficient, and the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

The data creation program of the above embodiment is a program for creating data for controlling a spatial light modulator, and is configured to cause a computer to execute an intensity spectrum calculation step of generating an intensity spectrum function to be used for creating the data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform; and a data generation step of creating the data on the basis of the phase spectrum function and the intensity spectrum function generated in the intensity spectrum calculation step, and in the intensity spectrum calculation step, the first replacement is performed using a result of multiplying a function representing the desired temporal intensity waveform by a coefficient, and the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication.

In the above configuration, the phase spectrum design unit may repeatedly perform the Fourier transform, the first replacement, the inverse Fourier transform, and the second replacement, and the data generation unit may create the data on the basis of the phase spectrum function obtained after the repetition. Further, in the above configuration, the intensity spectrum design unit may repeatedly perform the Fourier transform, the first replacement, the inverse Fourier transform, and the second replacement, and the data generation unit may create the data on the basis of the intensity spectrum function obtained after the repetition.

As described above, by repeatedly performing the iterative Fourier transform, the intensity spectrum or the phase spectrum for bringing the temporal intensity waveform of light closer to the desired waveform can be calculated with higher accuracy.

In the above configuration, the coefficient may have a value with which a time integral value of a result of multiplying a function, including a difference between the temporal intensity waveform function after the Fourier transform and the function after the multiplication, by a first weight function having a larger weight value when the intensity is higher at each time of the function before the multiplication, is minimized. As a result, the difference between the function after the multiplication and the temporal intensity waveform function after the Fourier transform in the part where the intensity is high in the desired temporal intensity waveform can be selectively reduced, and the temporal waveform in the part with the high light intensity can be brought closer to the desired waveform with higher accuracy.

In this case, the first weight function may include a function obtained by multiplying the function before the multiplication by another coefficient. For example, with the above configuration, it is possible to appropriately determine the first weight function having a larger weight value when the intensity is higher at each time of the function before the multiplication.

In the above configuration, the first replacement may be performed using a sum of a result of multiplying a function, obtained by subtracting the temporal intensity waveform function after the Fourier transform from the function after the multiplication, by a second weight function, and the function after the multiplication, and the second weight function may have a larger weight value when the intensity is higher at each time of the function before the multiplication. As a result, the temporal waveform in the part where the light intensity is high particularly in the temporal waveform of the output light can be brought closer to the desired waveform with higher accuracy.

The light control apparatus of the above embodiment is configured to include a light source for outputting input light; a dispersive element for spectrally dispersing the input light; a spatial light modulator for modulating the input light after the dispersion and outputting modulated light; and an optical system for focusing the modulated light, and the spatial light modulator modulates the input light on the basis of the data created by the data creation apparatus having the above configuration.

According to the above light control apparatus, the input light is modulated on the basis of the data created by the data creation apparatus of the above configuration, so that it is possible to calculate an intensity spectrum or a phase spectrum to bring a temporal waveform in a part with a high light intensity particularly in a temporal waveform of light closer to a desired waveform with higher accuracy while preventing a solution from being led to a local solution at the time of an iterative Fourier operation.

An embodiment can be used as a data creation apparatus, a light control apparatus, a data creation method, and a data creation program, which are capable of calculating an intensity spectrum or a phase spectrum to bring a temporal waveform in a part with a high light intensity particularly in a temporal waveform of light closer to a desired waveform with higher accuracy while preventing a solution from being led to a local solution at the time of an iterative Fourier operation.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A data creation method for creating, by a computer, data for controlling a spatial light modulator in an optical system for generating, from input light, output light having a temporal intensity waveform different from that of the input light, the method comprising:

generating an intensity spectrum function to be used for creating data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform;

creating the data on the basis of the phase spectrum function and the intensity spectrum function;

providing a control signal based on the created data to the spatial light modulator; and controlling the spatial light modulator on the basis of the control signal, wherein the first replacement is performed using a result of multiplying a function representing the desired temporal intensity waveform by a coefficient, the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication, and the coefficient has a value with which a time integral value of a result of multiplying a function, including a difference between the temporal intensity waveform function after the Fourier transform and the function after the multiplication, by a first weight function having a larger weight value when the intensity is higher at each time of the function before the multiplication, is minimized.

2. The data creation method according to claim 1, wherein generating the intensity spectrum function to be used for creating the data by repeatedly performing the Fourier transform, the first replacement, the inverse Fourier transform, and the second replacement, and the data is created on the basis of the generated intensity spectrum function by the repeatedly performing of the Fourier transform, the first replacement, the inverse Fourier transform, and the second replacement.

3. The data creation method according to claim 1, wherein the first weight function includes a function obtained by multiplying the function by another coefficient.

4. The data creation method according to claim 1, wherein the first replacement is performed using a sum of a result of multiplying a function, obtained by subtracting the temporal intensity waveform function after the Fourier transform from the function after the multiplication, by a second weight function, and the function after the multiplication, and the second weight function has a larger weight value when the intensity is higher at each time of the function before the multiplication.

5. A computer including a processor and a memory that stores instructions, the instructions, when executed by the processor, performing a data creation method for creating data for controlling a spatial light modulator in an optical system for generating, from input light, output light having a temporal intensity waveform different from that of the input light, the method comprising:

generating an intensity spectrum function to be used for creating data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform;

creating the data on the basis of the phase spectrum function and the intensity spectrum function;

providing a control signal based on the created data to the spatial light modulator; and controlling the spatial light modulator on the basis of the control signal, wherein the first replacement is performed using a result of multiplying a function representing the desired temporal intensity waveform by a coefficient, the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication, and the coefficient has a value with which a time integral value of a result of multiplying a function, including a difference between the temporal intensity waveform function after the Fourier transform and the function after the multiplication, by a first weight function having a larger weight value when the intensity is higher at each time of the function before the multiplication, is minimized.

6. The computer according to claim 5, wherein generating the intensity spectrum function to be used for creating the data by repeatedly performing the Fourier transform, the first replacement, the inverse Fourier transform, and the second replacement, and the data is created on the basis of the generated intensity spectrum function by the repeatedly performing of the Fourier transform, the first replacement, the inverse Fourier transform, and the second replacement.

7. The computer according to claim 5, wherein the first weight function includes a function obtained by multiplying the function by another coefficient.

8. The computer according to claim 5, wherein the first replacement is performed using a sum of a result of multiplying a function, obtained by subtracting the temporal intensity waveform function after the Fourier transform from the function after the multiplication, by a second weight function, and the function after the multiplication, and the second weight function has a larger weight value when the intensity is higher at each time of the function before the multiplication.

9. A non-transitory computer-readable medium storing a program, the program, when executed by a computer, performing a data creation method for creating data for controlling a spatial light modulator in an optical system for generating, from input light, output light having a temporal intensity waveform different from that of the input light, the method comprising:

generating an intensity spectrum function to be used for creating data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform;

creating the data on the basis of the phase spectrum function and the intensity spectrum function;

providing a control signal based on the created data to the spatial light modulator; and controlling the spatial light modulator on the basis of the control signal, wherein the first replacement is performed using a result of multiplying a function representing the desired temporal intensity waveform by a coefficient, the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication, and the coefficient has a value with which a time integral value of a result of multiplying a function, including a difference between the temporal intensity waveform function after the Fourier transform and the function after the multiplication, by a first weight function having a larger weight value when the intensity is higher at each time of the function before the multiplication, is minimized.

10. The non-transitory computer-readable medium according to claim 9, wherein generating the intensity spectrum function to be used for creating the data by repeatedly performing the Fourier transform, the first replacement, the inverse Fourier transform, and the second replacement, and the data is created on the basis of the generated intensity spectrum function by the repeatedly performing of the Fourier transform, the first replacement, the inverse Fourier transform, and the second replacement.

11. The non-transitory computer-readable medium according to claim 9, wherein the first weight function includes a function obtained by multiplying the function by another coefficient.

12. The non-transitory computer-readable medium according to claim 9, wherein the first replacement is performed using a sum of a result of multiplying a function, obtained by subtracting the temporal intensity waveform function after the Fourier transform from the function after the multiplication, by a second weight function, and the function after the multiplication, and the second weight function has a larger weight value when the intensity is higher at each time of the function before the multiplication.

13. A data creation method for creating, by a computer, data for controlling a spatial light modulator in an optical system for generating, from input light, output light having a temporal intensity waveform different from that of the input light, the method comprising:

generating an intensity spectrum function to be used for creating data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform;

creating the data on the basis of the phase spectrum function and the intensity spectrum function;

providing a control signal based on the created data to the spatial light modulator; and controlling the spatial light modulator on the basis of the control signal, wherein the first replacement is performed using a result of multiplying a function representing the desired temporal intensity waveform by a coefficient, the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication, the first replacement is performed using a sum of a result of multiplying a function, obtained by subtracting the temporal intensity waveform function after the Fourier transform from the function after the multiplication, by a second weight function, and the function after the multiplication, and the second weight function has a larger weight value when the intensity is higher at each time of the function before the multiplication.

14. The data creation method according to claim 13, wherein generating the intensity spectrum function to be used for creating the data by repeatedly performing the Fourier transform, the first replacement, the inverse Fourier transform, and the second replacement, and the data is created on the basis of the generated intensity spectrum function by the repeatedly performing of the Fourier transform, the first replacement, the inverse Fourier transform, and the second replacement.

15. A computer including a processor and a memory that stores instructions, the instructions, when executed by the processor, performing a data creation method for creating data for controlling a spatial light modulator in an optical system for generating, from input light, output light having a temporal intensity waveform different from that of the input light, the method comprising:

generating an intensity spectrum function to be used for creating data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform;

creating the data on the basis of the phase spectrum function and the intensity spectrum function;

providing a control signal based on the created data to the spatial light modulator; and controlling the spatial light modulator on the basis of the control signal, wherein the first replacement is performed using a result of multiplying a function representing the desired temporal intensity waveform by a coefficient, the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication, the first replacement is performed using a sum of a result of multiplying a function, obtained by subtracting the temporal intensity waveform function after the Fourier transform from the function after the multiplication, by a second weight function, and the function after the multiplication, and the second weight function has a larger weight value when the intensity is higher at each time of the function before the multiplication.

16. The computer according to claim 15, wherein generating the intensity spectrum function to be used for creating the data by repeatedly performing the Fourier transform, the first replacement, the inverse Fourier transform, and the second replacement, and the data is created on the basis of the generated intensity spectrum function by the repeatedly performing of the Fourier transform, the first replacement, the inverse Fourier transform, and the second replacement.

17. A non-transitory computer-readable medium storing a program, the program, when executed by a computer, performing a data creation method for creating data for controlling a spatial light modulator in an optical system for generating, from input light, output light having a temporal intensity waveform different from that of the input light, the method comprising:

generating an intensity spectrum function to be used for creating data by performing a Fourier transform on a waveform function in a frequency domain including an intensity spectrum function and a phase spectrum function, performing a first replacement of a temporal intensity waveform function based on a desired temporal intensity waveform in a time domain after the Fourier transform and then performing an inverse Fourier transform, and performing a second replacement to constrain the phase spectrum function in the frequency domain after the inverse Fourier transform;

creating the data on the basis of the phase spectrum function and the intensity spectrum function;

providing a control signal based on the created data to the spatial light modulator; and controlling the spatial light modulator on the basis of the control signal, wherein the first replacement is performed using a result of multiplying a function representing the desired temporal intensity waveform by a coefficient, the coefficient has a value with which a difference between the function after the multiplication of the coefficient and the temporal intensity waveform function after the Fourier transform is smaller than a difference before the multiplication, and a ratio of the difference is smaller when an intensity is higher at each time of the function before the multiplication, the first replacement is performed using a sum of a result of multiplying a function, obtained by subtracting the temporal intensity waveform function after the Fourier transform from the function after the multiplication, by a second weight function, and the function after the multiplication, and the second weight function has a larger weight value when the intensity is higher at each time of the function before the multiplication.

18. The non-transitory computer-readable medium according to claim 17, wherein generating the intensity spectrum function to be used for creating the data by repeatedly performing the Fourier transform, the first replacement, the inverse Fourier transform, and the second replacement, and the data is created on the basis of the generated intensity spectrum function by the repeatedly performing of the Fourier transform, the first replacement, the inverse Fourier transform, and the second replacement.

* * * * *